(12) United States Patent
Fujita et al.

(10) Patent No.: US 6,604,268 B1
(45) Date of Patent: Aug. 12, 2003

(54) APPARATUS FOR PROCESSING AN END OF A SHIELDED CABLE

(75) Inventors: Koji Fujita, Yokkaichi (JP); Yoshinobu Ohta, Yokkaichi (JP); Haruhito Kobayashi, Yokkaichi (JP); Masayuki Kawamura, Yokkaichi (JP)

(73) Assignee: Sumitomo Wiring Systems, Ltd (JP)

( * ) Notice: Subject to any disclaimer, the term of this patent is extended or adjusted under 35 U.S.C. 154(b) by 106 days.

(21) Appl. No.: 09/718,565

(22) Filed: Nov. 22, 2000

Related U.S. Application Data

(62) Division of application No. 09/390,431, filed on Sep. 7, 1999, now Pat. No. 6,243,947.

(30) Foreign Application Priority Data

Sep. 22, 1998 (JP) .............................. 10-267993
Mar. 30, 1999 (JP) .............................. 11-89321

(51) Int. Cl.[7] ................ B21B 15/00; B21D 39/03; B29P 23/04; B29P 25/00
(52) U.S. Cl. ................ 29/33 F; 29/867; 29/828; 29/863; 72/416; 72/470
(58) Field of Search ................ 29/828, 867, 564.8, 29/33 F, 33 M, 863; 72/470, 407, 416

(56) References Cited

U.S. PATENT DOCUMENTS

| | | | |
|---|---|---|---|
| 2,758,491 A | 8/1956 | Buchanan | |
| 3,028,776 A | * 4/1962 | Keller et al. | ................ 29/517 |
| 3,721,138 A | 3/1973 | Kamimura et al. | |
| 4,719,697 A | 1/1988 | Schwartzman et al. | |
| 4,873,901 A | 10/1989 | Stoehr | |
| 4,914,986 A | 4/1990 | Masaki | |
| 5,269,206 A | * 12/1993 | Yagawa | ................ 81/9.51 |
| 5,335,531 A | 8/1994 | Mann et al. | |
| 5,477,608 A | * 12/1995 | Woll | ................ 29/753 |

FOREIGN PATENT DOCUMENTS

| | | |
|---|---|---|
| JP | 2-273472 | 11/1990 |
| JP | 5-146022 | 6/1993 |
| JP | 6-22427 | 1/1994 |
| JP | 8-4714 | 1/1996 |

* cited by examiner

*Primary Examiner*—Richard Chang
(74) *Attorney, Agent, or Firm*—Anthony J. Casella; Gerald E. Hespos

(57) ABSTRACT

An apparatus is provided for widening the woven conductive sheath that Surround a shielded cable. The apparatus includes opposed punches that move into Contact with the exposed conductive sheath. Forces exerted by the punches are Sufficient to cause the extreme end of the exposed conductive sheath to be flared outwardly. The punches may be moved circumferentially around the wire for successive punching operations to achieve a uniform flaring. The punches also may be moved axially further away from the flared end to perform a second series of punches to flare the conductive sheath even further. The flared conductive sheath then can be folded over the insulating sheath.

9 Claims, 23 Drawing Sheets

APPARATUS FOR PROCESSING AN END OF A SHIELDED CABLE

This application is a divisional of U.S. patent application Ser. No. 09/390,431 filed Sep. 7, 1999 U.S. Pat. No. 6,243, 947.

BACKGROUND OF THE INVENTION

1. Field of the Invention

The present invention relates to a method and an apparatus for processing an end of a cable, in particular of a shielded cable.

2. Description of the Related Art

The prior art shielded cable has an insulated wire covered with a conductive sheath, and has the conductive sheath covered with an insulating sheath. The prior art shielded cable is used mainly as an antenna cable for an automotive vehicle or for transmitting and receiving signals in communication equipment.

The conductive sheath in the prior art shielded cable is made of a so-called woven sheath which is a tube of woven fine metal wires. There are single-layer woven sheaths and multi-layer woven sheaths.

The prior art shielded cable with the above-described woven sheath requires a specified processing to an end of the shielded cable. The insulated wire then must be connected with a specific electrical wiring system, and the woven sheath must be connected with another electrical wiring system (mainly ground potential). However, if the end of the shielded cable is processed manually, efficiency is poor and finished shielded cables vary. This results in a poor yield.

In view of the above problem, methods and apparatuses for applying processing to an end of a shielded cable have been proposed. There are roughly two known technical measures.

The first technical measure concerns methods and apparatuses as disclosed in Japanese Unexamined Patent Publications No. 5(HEI)-146022 and 6(HEI)-22427, according to or in which a woven sheath is exposed by making an annular cut in an insulating sheath of a shielded cable, the exposed woven sheath is caused to bulge radially out, and the outer edge of the bulged portion is cut. Known methods for bulging the woven sheath out include a method according to which the woven sheath is pushed manually toward the base end of the peeled insulating sheath, and a method according to which a cut piece of the insulating sheath is slid on the woven sheath to move the woven sheath toward the base end of the peeled insulating sheath.

The second technical measure concerns methods and apparatuses as disclosed in Japanese Unexamined Patent Publication No. 2-273472, according to or in which a part of a woven sheath exposed by peeling is perforated and a core is drawn through the perforation.

In the first conventional methods and apparatuses described above, processing is difficult since the woven sheath is bulged out annularly or radially. In other words, it is often difficult to automate an operation step of radially bulging the woven sheath out, which results in a poor yield. Particularly, if the woven sheath is multi-layered, there is a disadvantage that the woven sheath is buckled and cannot be bulged out to have a desired shape according to the method for moving the woven sheath. Further, the first technical measure is not preferable because it necessitates many operation steps and results in much waste material.

On the other hand, in the second methods and apparatuses, it is difficult to insert a needle between the woven sheath and the insulated wire. In other words, the needle needs to be pushed while prying or forcibly widening the woven sheath in order to be inserted between the woven sheath and the insulated wire. Such a needle inserting operation requires relatively complicated movements of the needle, and efficiency cannot be improved.

Furthermore, in the case of connecting a terminal, for example, with an insulated cable, it is necessary to peel a part of an insulation coating to expose a conductor at an end of the cable. In an apparatus in which this cable end processing is mechanized, a positioned cable is held by clamps, and an annular cut is made in an insulation coating by piercing a pair of opposed peeling blades into the insulation coating. Thereafter, the cut piece of the insulation coating is peeled off by relatively moving the peeling blades and the cable. Most apparatuses adopt this method for the peeling of the insulation coating at the cable end.

The peeling of a single-core insulated cable can be completed only by peeling the insulation coating once. However, a multiple-core insulated cable needs to be peeled such that the respective core wires are first exposed at their ends by peeling an outer sheath, and then conductors are exposed by peeling the insulation coatings of the respective core wires. Thus, peeling needs to be performed several times to process an end of one cable.

FIG. 21(a) shows a prior art shielded cable A in which an insulated wire comprised of a conductor S1 and an insulation coating S2 is coated with a woven sheath S3, and the woven sheath S3 is covered with an outer sheath S4. The prior art shielded cable A needs to have its end processed as follows. First, the outer sheath S4 is peeled to expose the woven sheath S3 at the end. Subsequently, the insulated wire is exposed by, for example, turning the exposed woven sheath S3 up around the outer sheath S4. Then, the insulation coating S2 is peeled to expose the conductor S1 in the middle. Accordingly, peeling is performed twice for processing an end of one cable.

In the case that a great number of cables are processed using the end processing apparatus, handling of the scrap insulation coatings peeled off becomes a problem.

Scattering of the scrap insulation coatings deteriorates a work environment and, in a worse case, may be jammed in the apparatus, causing the apparatus to stop.

In view of the above, a scrap collecting box is installed in the vicinity of peeling blades so that the scrap insulation coating peeled off the cables can drop into the collecting box.

Alternatively, there has been proposed an apparatus in which a suction pipe is arranged on an extension of the cable end and near the peeling blades to collect the scape insulation coatings peeled off the cables by suction (Japanese Unexamined Patent Publication No. 7-95710).

A collection error may occur with the method for collecting the dropped scrap insulation coatings by the collecting box, and the scattering of the scrap cannot be prevented sufficiently.

On the other hand, since cable end is not guided while peeling is performed in the apparatus disclosed in the above publication for collecting the scrap insulation coatings by the suction pipe, there may be a variation in the quality of the processed cable ends. To avoid this problem, such a method may be adopted, according to which the cable end is supported by a guide member before the peeling blades are pierced into the insulation coating. The guide member is replaced by the suction pipe after the insulation coating is cut, and then the cut piece of the insulation coating is peeled off and collected by the suction pipe. However, such a method increases the number of operation steps of the apparatus, thereby reducing an operation efficiency.

Besides, since the suction pipe is wide open in the apparatus of the above publication, the scrap insulation coating may bounce in the suction pipe and jump out of it. Further, the wide opening of the suction pipe causes a large loss in section force and, accordingly, requires a suction means to have a large suction capacity.

The present invention was developed in view of the above problems, and an object thereof is to provide cable end processing method and apparatus which enables an improved handling, preferably enabling an automated operation, particularly an automated operation step of widening a woven sheath, or furthermore preferably allowing to completely collect scrap insulation coatings without degrading processing quality and operation efficiency in order to maintain a stable operation of an apparatus and a clear work environment

SUMMARY OF THE INVENTION

According to the invention, there is provided a method for processing an end of a shielded cable in which a conductive sheath or shield, preferably a woven sheath, covering an insulated wire is partly exposed from an end of an insulating sheath covering the conductive sheath. The method comprises a step of widening an end portion of the exposed conductive sheath, by punching the exposed conductive sheath, (preferably substantially in radial direction) by at least one pair of punches. The punching preferably is carried out at the base end of the exposed conductive sheath.

Accordingly, the exposed conductive sheath, is punched in the radial directions in the widening step of widening the exposed conductive sheath, and separating it from the outer surface of the insulated wire. Accordingly, the conductive sheath, can be deformed and widened easily even if it has a multi-layer construction.

According to a preferred embodiment of the invention, the punching step comprises a step of moving the pair of punches relative to the exposed conductive or woven sheath along a relative movement direction. The relative movement direction is arranged at an angle of between about 70° and about 110°, preferably between about 80° and about 100°, most preferably of about 90° with respect to a longitudinal direction of the wire.

The method may further comprise a step of arranging the punches at an angle of between about 70° and about 110°, preferably between about 80° and about 100°, most preferably of about 90° with respect to a longitudinal direction of the wire.

In a preferable embodiment, the widening step comprises steps of punching at least one intermediate position of the exposed conductive sheath with respect to its longitudinal direction and then punching the base end of the exposed conductive sheath. Accordingly, the exposed conductive sheath can be deformed plastically with greater security since punching is applied in a plurality of positions.

In another embodiment, the widening step comprises a step of changing punching positions by relatively displacing the pair of punches and the exposed conductive sheath, preferably woven sheath substantially about a center axis of the conductive sheath. Accordingly, the punches and the exposed conductive sheath are displaced along the circumferential direction of the conductive sheath, to change the punching positions when the exposed conductive sheath is punched in the widening step. Accordingly, suitable punching can be applied over the entire circumference of the conductive sheaths using the same punch even if the conductive sheaths have different diameters.

In still another embodiment, there is provided a turning step of introducing a portion of the insulated wire where the conductive sheath is widened into a pipe, and sliding turning members capable of surrounding the pipe from a pipe side toward a shielded cable side to turn the widened exposed conductive sheath, around a peeled end of the insulating sheath. Accordingly, the exposed insulated wire can be introduced easily into the pipe, since the conductive sheath is already widened and separated from the insulated wire. This introduction into the pipe enables the base portion of the conductive sheath, that is exposed between the end surface of the pipe and the insulating sheath to be bent, thereby widening the conductive sheath, substantially in radial directions. Thereafter, the exposed conductive sheath is folded back at its base portion to extend along the outer end portion of the insulating sheath by sliding the turning members from the pipe side to the shielded cable side, with the result that the exposed conductive sheath is turned up.

In still another embodiment, there is provided a step of substantially surrounding the insulating sheath by the turning members before the insulated wire is introduced into the pipe. The step of surrounding the insulating sheath of the shielded cable by the turning members during the introduction into the pipe enables the insulated wire to be introduced to the pipe with the shielded cable held in a manner that substantially prevents buckling.

According to the invention, there also is provided an apparatus for processing an end of a shielded cable in which a conductive sheath covering an insulated wire is partly exposed from an end of an insulating sheath that covers the conductive sheath. The apparatus comprises one or more clamps for holding the shielded cable while releasing the end of the shielded cable. A pair of punches is provided for punching the exposed conductive sheath of the shielded cable held by the clamps, and a driving mechanism is provided for driving the punches to punch the exposed conductive sheath. The apparatus further comprises a punching control means for controlling the drive of the punches by the driving mechanism.

According to a preferred embodiment of the invention, there is provided an apparatus for processing an end of a shielded cable in which a conductive sheath, preferably woven sheath covering an insulated wire is partly exposed from an end of an insulating sheath covering the conductive sheath, preferably woven sheath. The apparatus comprises at least one clamp for holding the shielded cable while releasing the end of the shielded cable. A positioning means is provided for positioning a holding position of the shielded cable by the clamps. A pair of punches are provided for punching the exposed conductive sheath of the shielded cable held by the clamps based on the holding position of the shielded cable positioned by the positioning means, and a driving mechanism drives the punches to punch the exposed conductive sheath substantially in radial directions. A punching control means controls the drive of the punches by the driving mechanism. Accordingly, the exposed conductive sheath is punched in radial directions by driving the punches with the driving mechanism when the exposed conductive sheath is widened and separated from the outer surface of the insulated wire. Accordingly, the conductive sheath can be deformed easily and widened at its punched positions even if it has a multi-layer construction.

According to a preferred embodiment of the invention the driving mechanism drives the pair of punches relative to the exposed conductive or woven sheath along a relative movement direction that is arranged at an angle of between about 70° and about 110°, preferably between about 80° and about 100°, most preferably of about 90° with respect to a longitudinal direction of the wire. Preferably, the punches are arranged at an angle of between about 70° and about 110°, preferably between about 80° and about 100°, most preferably of about 90° with respect to a longitudinal direction of the wire.

In a preferable embodiment of the end processing apparatus, each punch comprises a linear punching edge. Accordingly, the punches for punching the exposed conductive sheath have bevelled linear punching edges. By punching the exposed conductive sheath with these punching edges, the exposed conductive sheath can be deformed and widened more easily at its punched positions.

In another embodiment of the end processing apparatus, there is further provided a changing means for changing punching positions by relatively displacing the shielded cable and the punches substantially along the circumferential direction and/or the longitudinal direction of the shielded cable. Accordingly, punching can be applied in a plurality of positions in the circumferential direction since the changing means relatively displaces the punches and the conductive sheath along the circumferential direction of the conductive sheath. As a result, suitable punching can be applied over the entire circumference of the exposed conductive sheath using the same punch even if the diameters of the conductive sheaths differ.

In still another embodiment of the end processing apparatus, the changing means comprises a sliding mechanism for relatively displacing the punches and the conductive sheath, preferably woven sheath. Thus the punching positions can be changed between an intermediate position of the exposed conductive sheath with respect to its longitudinal direction and a base end of the exposed conductive sheath. The apparatus further comprises a sliding control mechanism for controlling the sliding mechanism to punch the base end of the exposed conductive sheath after punching the intermediate position of the exposed conductive sheath, preferably woven sheath. Accordingly, the conductive sheath can be plastically deformed more securely since punching is applied in the plurality or positions.

In a further embodiment of the end processing apparatus, there also is provided a pipe capable of surrounding the insulated wire exposed by widening the conductive sheath. There also is provided a displacing mechanism for relatively displacing the pipe and the shielded cable between an introduction state where the insulated wire is introduced into the pipe and a retracted state where the insulated wire is retracted to the outside of the pipe. A pair of turning members with substantially semicircular recesses also are provided. The tuning members are arranged such that recesses thereof can be opposed to form a substantially circular opening for substantially surrounding the pipe. An opening mechanism is provided for opening the turning members, and a reciprocating mechanism reciprocates the turning members between a position outside the pipe and the insulating sheath of the shielded cable. The apparatus further comprises a turning control means for controlling the displacing mechanism, the opening mechanism and the reciprocating mechanism to turn the exposed conductive sheath by sliding the turning members toward the insulating sheath after surrounding the pipe into which the insulated wire is introduced. Accordingly, since the conductive sheath already has been widened and separated from the insulated wire, the exposed insulated wire can be introduced easily into the pipe. By this introduction into the pipe, the base portion of the conductive sheath that is exposed between the end surface of the pipe and the insulating sheath can be bent, to widen the conductive sheath in substantially radial directions. Thereafter, the exposed conductive sheath is folded back at its base portion to extend along the outer end portion of the insulating sheath by sliding the turning members from the pipe side to the shielded cable side.

In still a further embodiment of the end processing apparatus, there also is provided a peeling mechanism for peeling a portion of an insulation coating of the insulated wire exposed by turning the exposed conductive sheath. Since the shielded cable, which is positioned by the positioning means and clamped, is directly peeled, peeling can be consecutively performed with a high dimensional accuracy.

The turning control means preferably controls the displacing mechanism, the opening mechanism and the reciprocating mechanism so that the turning members surround the insulating sheath before the insulated wile is introduced into the pipe. Accordingly, the introduction into the pipe is performed when the shielded cable is held so as not to be buckled by surrounding the insulating sheath by the turning members.

In still another embodiment of the end processing apparatus, the radius of the recesses of the turning members is set to conform to the final dimension of the conductive sheath turned around the insulating sheath. Additionally the outer diameter of the pipe is set to have a fitting tolerance with respect to the radius of the recesses of the turning members. In the invention having the above specific features, since the dimensions of the recesses and the pipe are so set as to have the fitting tolerance when the turning members are moved toward the insulating sheath while surrounding the pipe. Accordingly, the conductive sheath widened around the pipe can be turned up around the insulating sheath while maintaining a clearance necessary and sufficient to slide the turning members. Further, since the recesses are set to conform to the final dimension of the conductive sheath turned around the insulating sheath, the conductive sheath is deformed plastically to have the final dimension by being turned by the turning members.

Here, the phrase "set to conform to the final dimension D1" means that the outer diameter of the shielded cable in its position where the conductive sheath is turned up is measured from samples obtained by plastically deforming the conductive sheath in advance to have the final dimension, and the measurement results are used as data. Based on this data, a dimension obtained when the turning members are slid from the pipe side toward the insulating sheath is set to become the final dimension.

According to the invention, there is further provided a cable end processing method for processing an end of a cable by piercing a pair of substantially opposed peeling blades into an insulation coating at the end of the cable and then relatively moving the peeling blades and the cable to peel a cut piece of the insulation coating off by the peeling blades. A suction nozzle is fitted or inserted substantially on the end of the cable, and the insulation coating is cut by the peeling blades while the end of the cable is guided by the suction nozzle. The peeling blades and the cable are moved relatively to collect the peeled piece of the insulation coating by the suction nozzle.

Preferably, the suction nozzle is fitted temporarily to a position beyond or after an insulation coating cutting position if necessary, and is moved backward to retract from the insulation coating cutting position before the peeling blades are pierced into the insulation coating.

In such a case, a cam surface and a cam follower preferably are provided to convert the piercing movement of the peeling blades into a movement arranged at an angle different from 0° or 180°, preferably a substantially perpendicular movement of the suction nozzle. Thus the suction nozzle moves backward by the cam surface and the cam follower before the peeling blades are pierced into the insulation coating. Such a method is preferable since a control for an apparatus is not too complicated and costs can be suppressed.

The operation of temporarily fitting the suction nozzle to the position beyond the insulation coating cutting position and then retracting it from the insulation coating cutting position is particularly effective when an end of a shielded cable having its outer or insulating sheath partly peeled off is processed.

The processing of the end of the shielded cable in which an end of a conductive sheath is exposed by partly peeling off the outer or insulating sheath may be performed according to a method comprising the steps of pushing the exposed conductive sheath by a widening means to open an end of the exposed conductive sheath wider. The method then includes fitting the suction nozzle on the insulated wire to push the widened conductive sheath open more widely. The method further includes sliding turning members that are capable of substantially enclosing the suction nozzle from a nozzle side toward a shielded cable side to turn the widened conductive sheath, up around the outer or insulating sheath. The method proceeds by using peeling blades for cutting and peeling off a piece of an insulation coating of the insulated wire exposed by turning the conductive sheath up, and/or collecting the peeled piece of the insulation coating by the suction nozzle. In such a case, the suction nozzle needs to be pushed to a position near the end of the outer or insulating sheath beyond the insulation coating cutting position in order to push the widened conductive sheath open more widely. The suction nozzle is moved backward to avoid the interference with the peeling blades to be pierced into the insulation coating.

A cable end processing apparatus according to the invention may comprise clamps for holding a cable, a suction nozzle to be fitted on an end of the cable held by the clamps, a peeling unit with at least one pair of substantially opposed peeling blades for cutting an insulation coating at the end of the cable guided by the suction nozzle, and a sliding mechanism for relatively moving the peeling unit and the clamps substantially along the longitudinal direction of the cable. The apparatus provided with the above means can be used to peel off a piece of an insulation coating of a single-core insulated wire, to peel off a piece of an outer or insulating sheath of a multiple-core insulated cable and pieces of insulation coatings of the respective core wires, and to peel off an outer or insulating sheath of a shielded cable.

According to a preferred embodiment, the apparatus further comprises a positioning means for positioning an end of a cable, wherein the clamps hold the positioned cable.

Since the exposed conductive sheath, preferably the woven sheath, needs to be handled in the end processing of the shielded cable having its outer or insulating sheath partly peeled off, the apparatus having the above means preferably is provided further with a widening mechanism for widening an end of an exposed conductive sheath, preferably woven sheath, of a shielded cable in which an outer or insulating sheath thereof is partly peeled off to expose a conductive sheath, provided between an insulated wire and the outer or insulating sheath from the end of the outer or insulating sheath. A turning mechanism is provided for pushing the widened conductive sheath open more widely by a suction nozzle fitted on an end of the insulated wire, and turning the widened conductive sheath up substantially around the outer or insulating sheath by turning members for sliding the suction nozzle from a position where the turning members substantially enclose the suction nozzle toward a shielded cable side. Means also are provided for moving the suction nozzle backward to retract it from an insulation coating cutting position before the peeling blades are pierced into the insulation coating.

The widening means for widening the end of the conductive sheath, preferably woven sheath is preferably the one proposed in Japanese Unexamined Patent Publication No. 10-267993 by the applicant of the present invention, i.e. the widening means for pushing the exposed conductive sheath, preferably woven sheath in radial directions by opposed punches or the like to warp and bend the free end of the exposed conductive sheath outwardly.

Accordingly, the suction nozzle is fitted on the end of the cable and the piece of the insulation coating is cut and peeled off while the end of the cable is guided by the suction nozzle. This eliminates a variation in the quality of the processed cable ends, which is caused by the displacement of the cable ends.

Further, since the cut piece of the insulation coating is peeled off while being located in the suction nozzle, there is no likelihood that the scrap insulation coating drops out of the suction nozzle.

Furthermore, since the suction nozzle is so dimensioned as to guide the cable end, there is a small loss of suction force and the suction means is allowed to have a small suction capacity.

These and other objects, features and advantages of the present invention will become more apparent upon a reading of the following detailed description and accompanying drawings.

DETAILED DESCRIPTION OF THE PREFERRED EMBODIMENTS

With reference to FIGS. 1 to 4, an end processing apparatus according to the invention is identified by the numeral 10 in FIGS. 1–4. The apparatus 10 is of the desktop type. In particular an operator standing in front of an unillustrated work table operates a foot switch 11 (see FIG. 1) to automatically process an end of the shielded cable S having a woven sheath partly exposed in advance.

Figure 4:
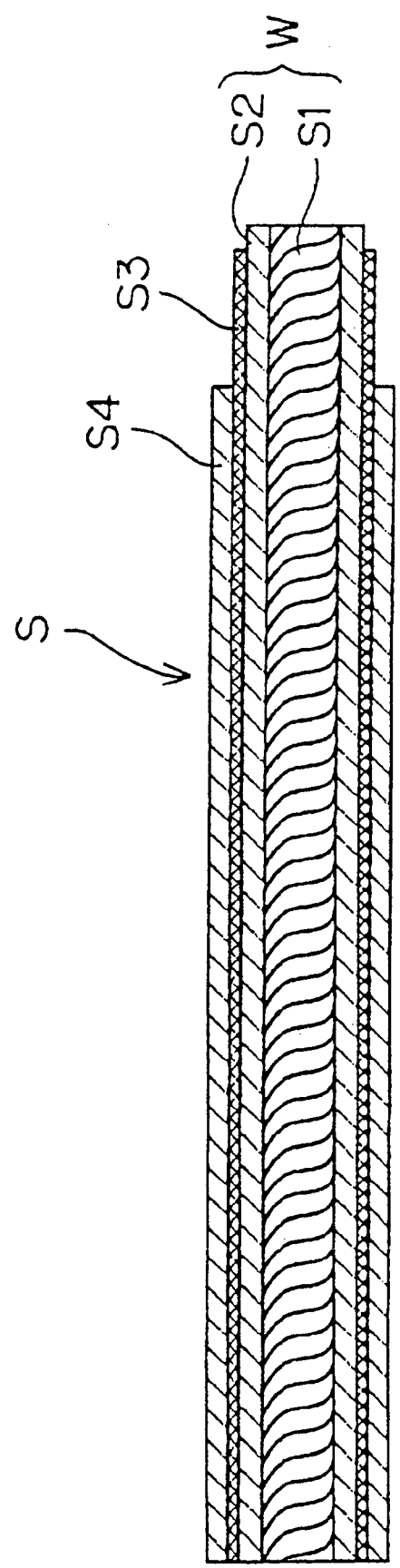
FIG. 4 is a schematic section of a shielded cable to be processed by the embodiment of FIG. 1.

As shown in FIG. 4, the shielded cable S has an electrically conductive twisted wire S1 is covered with an insulation coating S2. The insulation coating S2 is covered with a woven sheath S3, and the woven sheath S3 is covered with an insulating sheath S4. As an alternate to a woven sheath S3, a non-woven conductive sheath (not shown) can be used. The shielded cable S in the illustrated example is a coaxial cable used for a high-frequency connector. It should be noted that the twisted wire S1 and the insulation coating S2 are collectively referred to as an insulated wire W.

Figure 1:
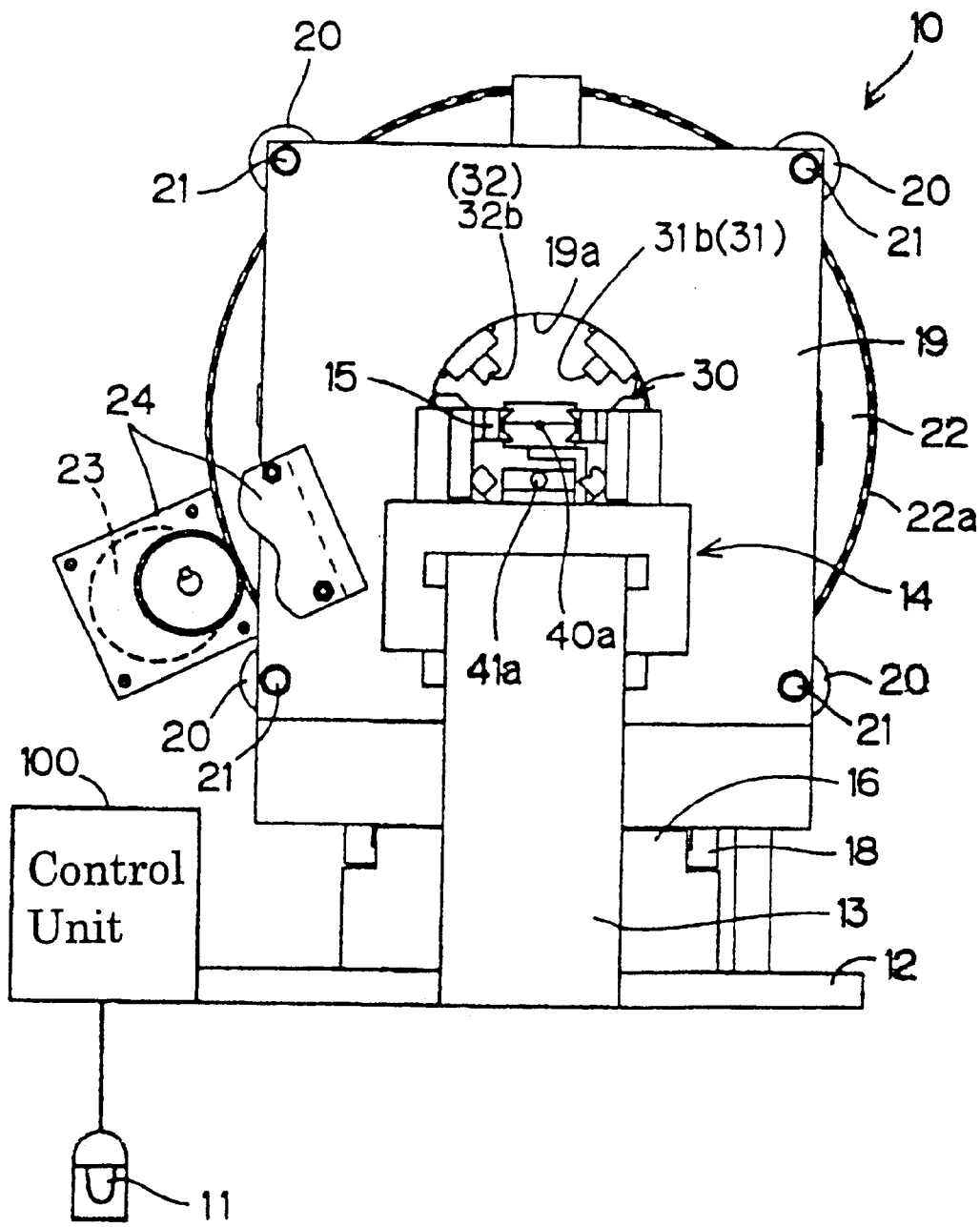
FIG. 1 is a schematic front view of an end processing apparatus according to one embodiment of the invention.
Figure 2:
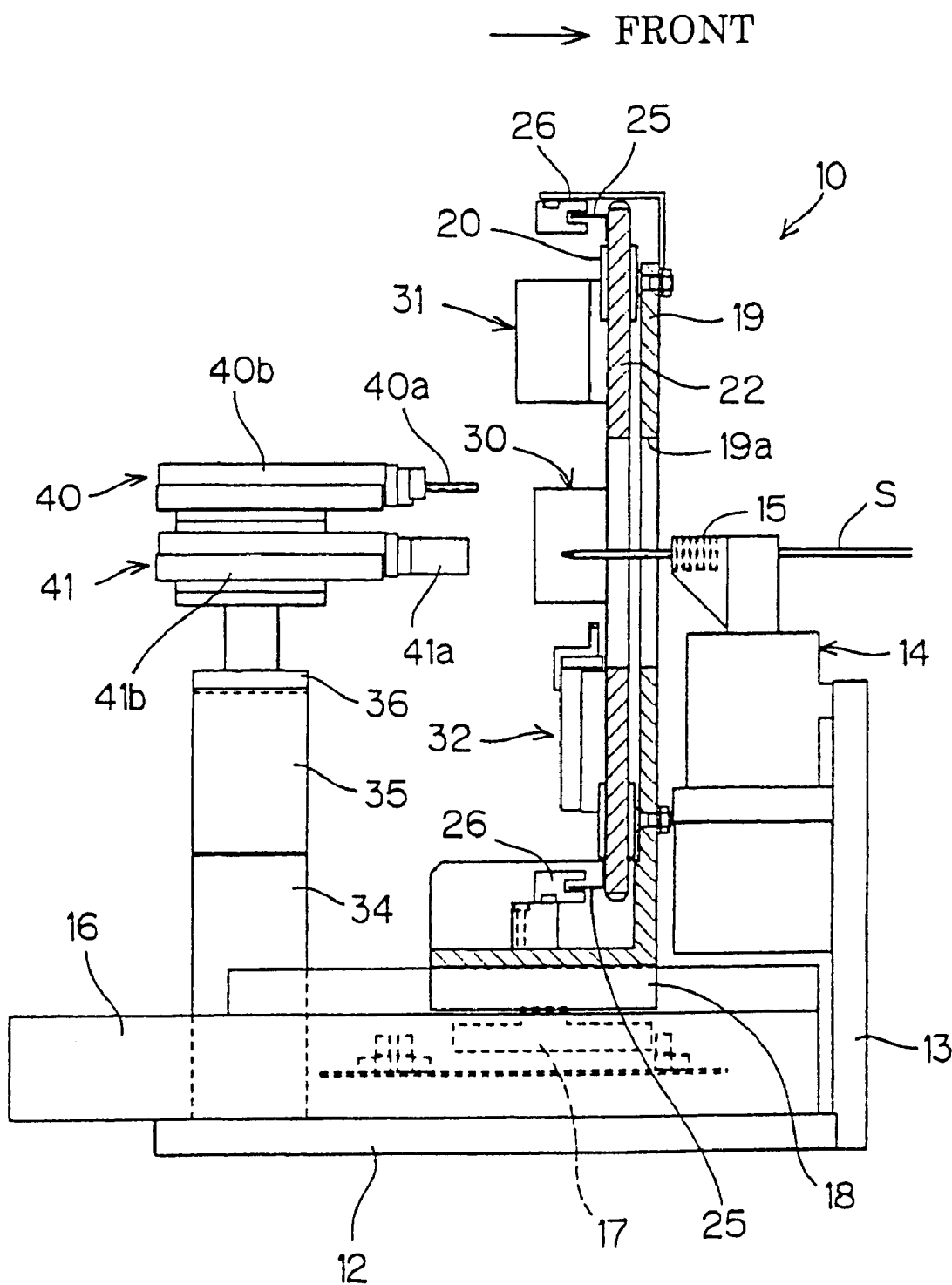
FIG. 2 is a side view of the end processing apparatus 10 of FIG. 1.
Figure 3:
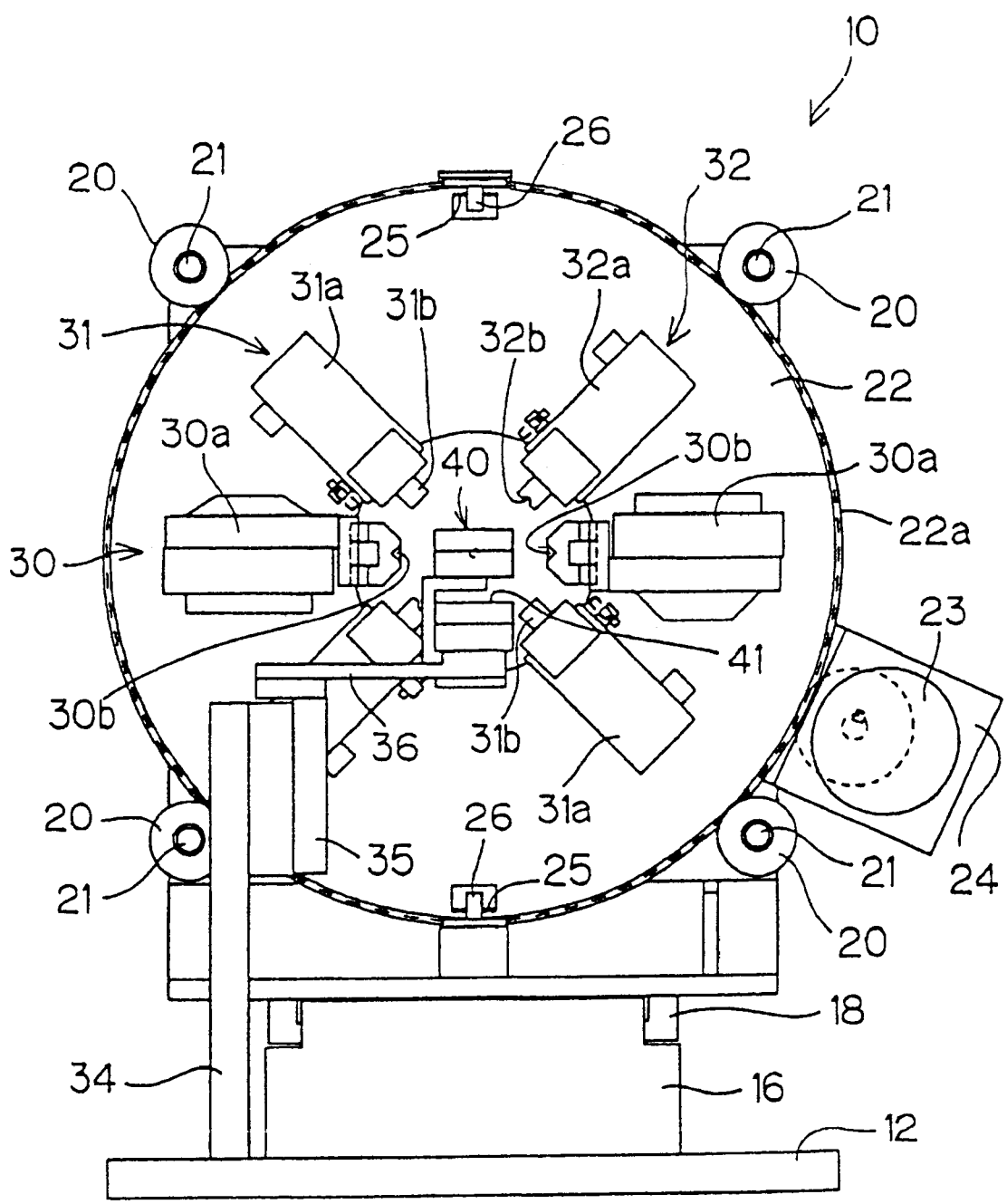
FIG. 3 is a rear view of the end processing apparatus 10 of FIG. 1.

With reference to FIGS. 1 to 3, the end processing apparatus 10 has a base 12 placed on the unillustrated work table. A stay 13 stands on a front end portion of the base 12, which is the end portion closer to the operator. A clamping unit 14 is provided on the stay 13. The shielded cable S can be held substantially horizontally by a pair of clamps 15 which are arranged in the clamping unit 14 to be opened and closed along the widthwise direction of the base 12.

A rail block 16 extends along forward and backward directions on the base 12, and a uniaxial robot 17 is provided therein. A slider 18 is mounted on the rail block 16, and is made reciprocatingly movable along forward and backward directions.

A mount plate 19 stands at the front end of the slider 18. An insertion hole 19a is formed substantially in the middle of the mount plate 19, and the shielded cable S held by the clamps 15 of the clamping unit 14 is or can be introduced substantially coaxially introduced through the insertion hole 19A as shown in FIG. 2.

Guide members 20 are mounted rotatably by support shafts 21 at four corners of the mount plate 19. These guide members 20 rotatably carry a ring-shaped gear disk 22 which is substantially coaxially rotatable with the clamped shielded cable S. Although the respective guide members 20 are preferably gears meshable with teeth 22a formed at the outer periphery of the gear disk 22, they may be rollers which merely are held in rolling contact with the circumferential surface of the gear disk 22.

An induction motor 23 for rotating the gear disk 22 is mounted on the mount plate 19 via a stay 24. The gear disk 22 can be rotated or pivoted by a desired angle in both directions by the induction motor 23. In the shown embodiment, a pair of dogs 25 (or carriers or stops or tappets or cams) are provided at the opposite end positions of one diameter of the gear disk 22 on the rear surface of the gear disk 22. A rotation control angle (180° in the shown example) of the gear disk 22 can be detected by detecting the positions of the dogs 25 by sensors 26 mounted on the mount plate 19. In the illustrated example, the respective sensors 26 are substantially opposed to each other along vertical direction, and an illustrated state where the dogs 25 are detected by the sensors 26 is set as an initial state (home position).

The sensors 26 are connected with a control unit 100 (shown only in FIG. 1) to be described later. The induction motor 23 is driven together with parts to be described later by the control unit 100 to control the phase of the gear disk 22.

With reference to FIG. 3, pairs of processing units (peeling units 30, punching units 31 and woven sheath turning units 32) for processing the clamped shielded cable S are provided on the rear surface of the gear disk 22 to oppose each other along diameters. The corresponding pairs of the processing units preferably are arranged substantially symmetrically with respect to the shielded cable S and are secured in positions circumferentially spaced at specified (predetermined or predeterminable) intervals.

In the illustrated initial state, the first processing unit pair arranged on the horizontal diameter comprises the peeling units 30. The peeling units 30 are adapted to cut off an end portion of the insulation coating S2 of the insulated wire W that had been exposed by a woven sheath turning operation that will be described later. The removal of the insulation coating 52 by the peeling unit 30 exposes the twisted wire S1. Each peeling unit 30 is comprised of an air cylinder 30a substantially arranged along a radial direction of the gear disk 22 and a peeling blade 30b driven in the radial direction by the air cylinder 30a. The insulation coating S2 of the insulated wire W can be cut by causing the respective peeling blades 30b to project toward the center of the gear disk 22 in the illustrated state.

Figure 7:
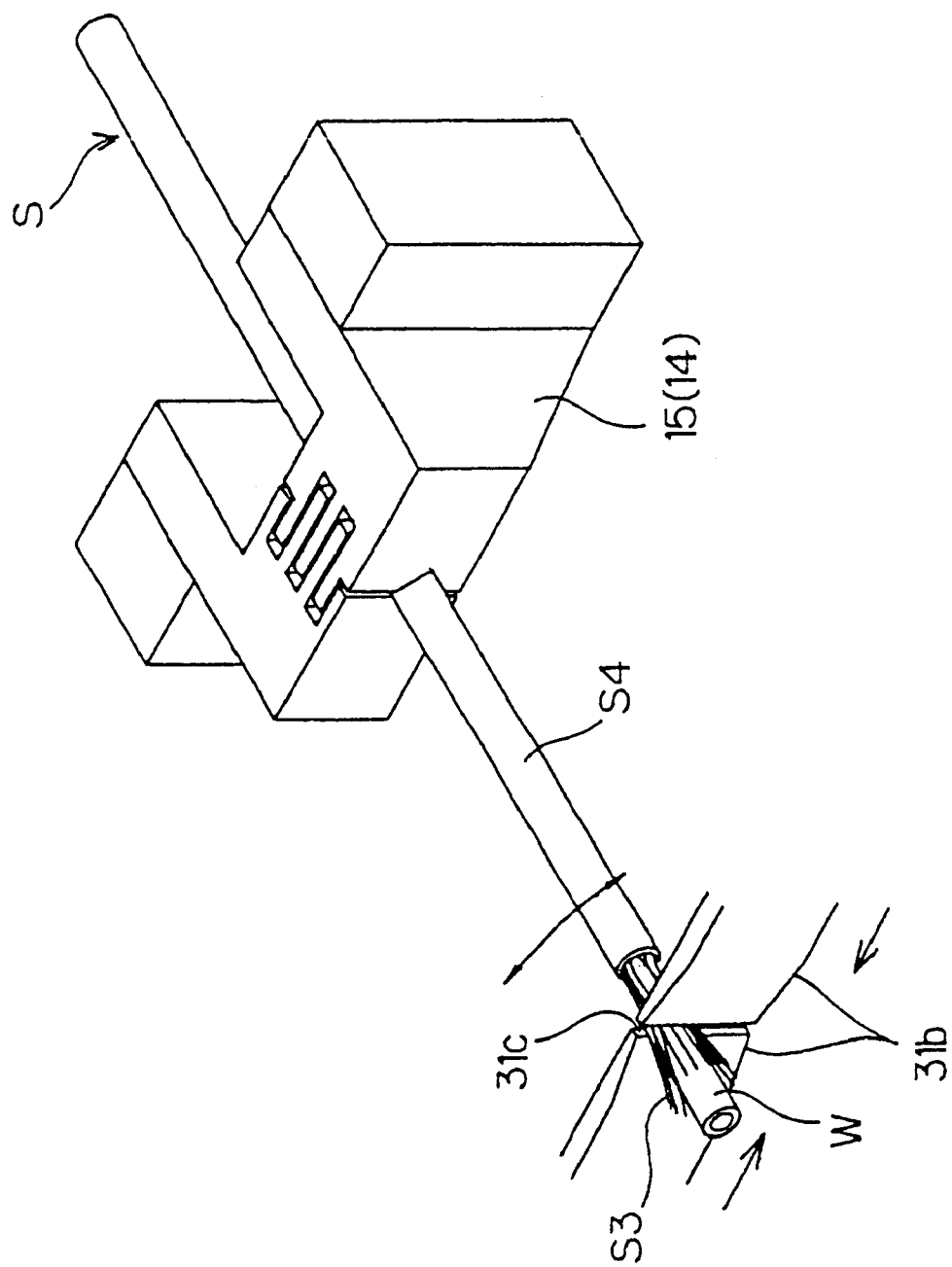
FIG. 7 is a perspective view showing a particular portion to describe a widening step.
Figure 26:
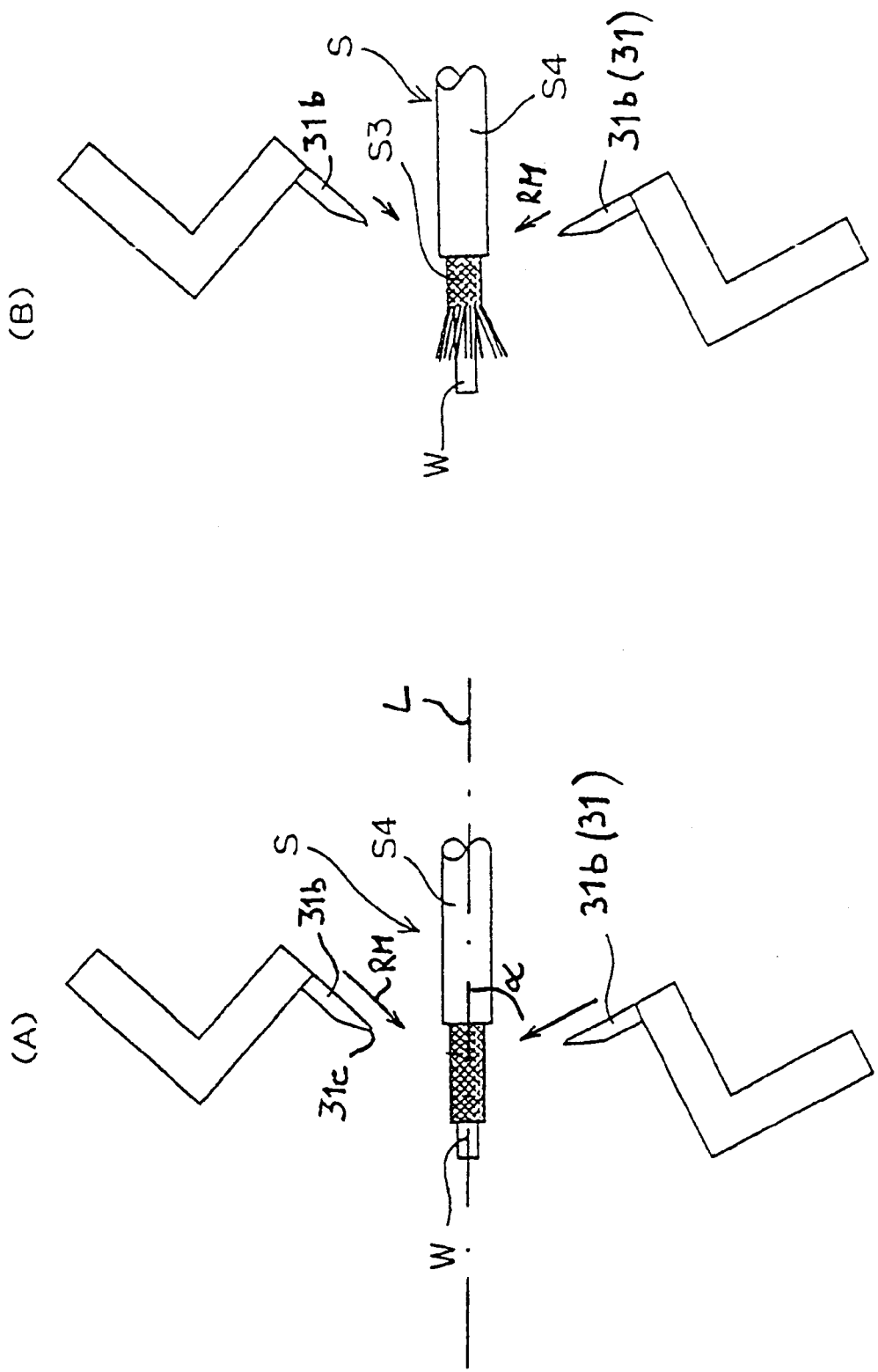
FIGS. 26(A) and 26(B) are schematic side views similar to FIGS. 9(A) and 9(B) showing a particular portion to describe a punching position in the widening step according to a further preferred embodiment of the invention.

At one side of each peeling unit 30 with respect to circumferential direction is arranged the punching unit 31. The punching unit 31 is adapted to punch the woven sheath S3 of the shielded cable S, and comprises an air cylinder 31a and a punch 31b which can be advanced and retracted substantially along a radial direction of the gear 22 by the air cylinder 31a. The punches 31b are driven by the air cylinders 31a to move between the retracted positions shown in FIG. 3 and punching positions (see FIG. 7) where they can cooperate to compress the woven sheath S3 of the shielded cable S. The punches 31b may be moved relative to the shielded cable S along a relative movement direction RM which is arranged at an angle α to the longitudinal direction L of the shielded cable S. The angle α may be substantially 90° (as shown in FIG. 7) or may have a value different from 0°, 90° or 180°, e.g. about 45° as shown in FIG. 26. The punches 31b do not need to be parallel with the relative movement direction RM, i.e. they do not need to be tilted or arranged at the same angle α. To the contrary, the punches 31b may be, for instance, substantially normal to the longitudinal direction L of the shielded cable S while the angle α is different from 90° or the punches may be arranged at an angle different from 0°, 90° and 180° with respect to the longitudinal direction L of the shielded cable S while the angle α is about 90°. It may be sufficient that the punches 31b have a radial movement component with respect to the longitudinal direction L of the shielded cable S. In the illustrated example, the rectangular leading ends of the punches 31b are tapered to form sharp punching edges 31c (see FIGS. 7 and 9).

The woven sheath turning unit 32 is arranged at the other side of each peeling unit 30 opposite from the punching unit 31 with respect to the circumferential direction of the gear disk 22. Each woven sheath turning unit 32 is comprised of an air cylinder 32a arranged substantially along a radial direction of the gear disk 22 and a turning plate (member) 32b which can be advanced and retracted substantially along the radial direction by the air cylinder 32a.

Figure 13:
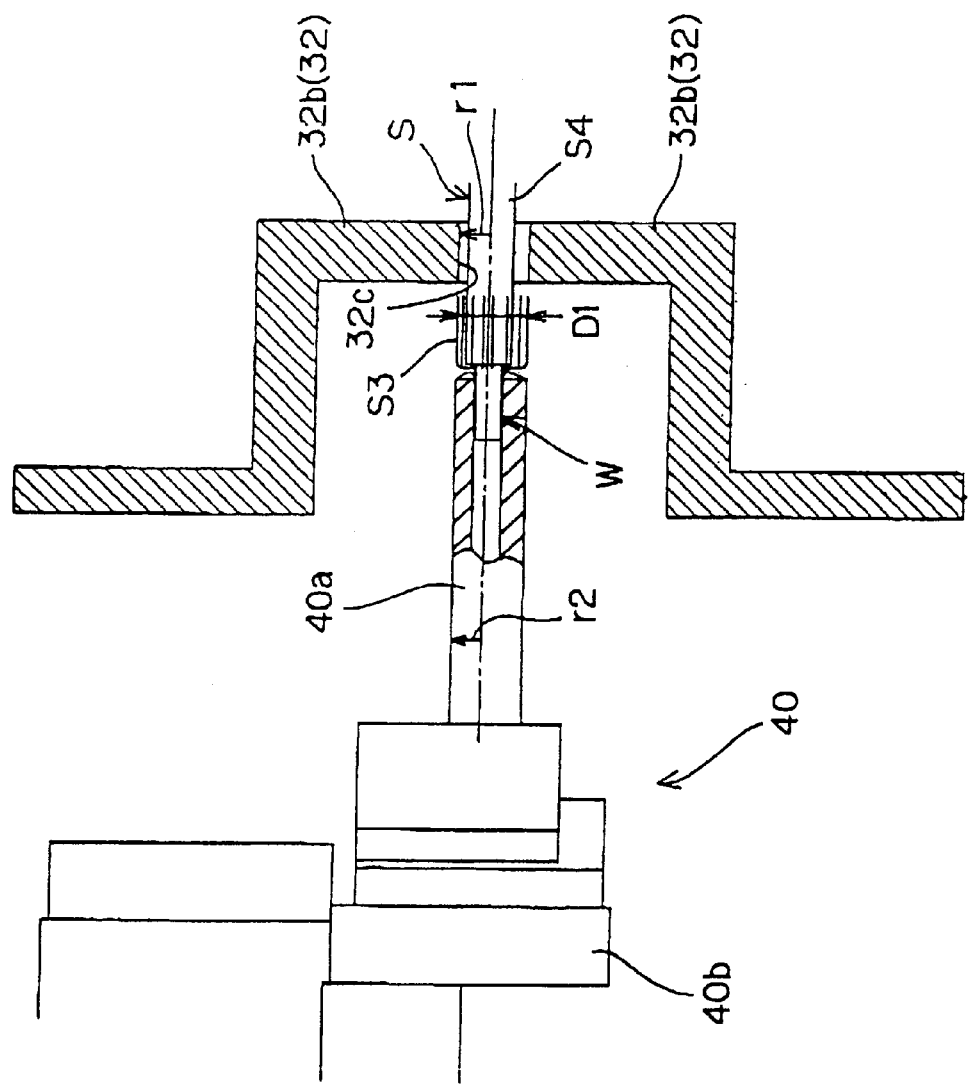
FIG. 13 is a schematic section showing further another process of the turning step.

The turning plates 32b each are formed with a semicircular recess 32c in conformity with the clamped shielded cable S, as shown in FIG. 13 and as described later. Thus, the turning plates 32b substantially can surround the shielded cable S or a pipe to be described later by being displaced inwardly substantially along the radial directions by the air cylinders 32a.

Next, with reference to FIGS. 2 and 3, a stay 34 stands at one end of the rear end of the base 12 with respect to the widthwise direction of the base 12, and an air cylinder 35 is secured to an upper end of one side surface of the stay 34. The air cylinder 35 is extendible along the widthwise direction of the base 12 and holds one end of a plate 36, another end of which is located near the center of the gear disk 22, and moves the plate 36 substantially upwardly and downwardly. A pipe unit 40 and a positioning unit 41 are placed one over the other in this order on the plate 36.

The pipe unit 40 includes a pipe 40a that extends substantially horizontally forwardly and an air cylinder 40b for driving the pipe 40a forwardly and backwardly.

The positioning unit 41 includes a rod-shaped positioning member 41a substantially horizontally extending forward and an air cylinder 41b for driving the positioning member 41a forwardly and backwardly.

The pipe 40a and the positioning members 41a of the respective units 40, 41 are arranged along the vertically extending diameter of the gear disk 22 so that they can be opposed substantially coaxially to the clamped shielded cable S. The pipe 40a and the positioning member 41a can be opposed selectively coaxially to the shielded cable S by driving the plate 36 upwardly or downwardly by the air cylinder 35.

Figure 5:
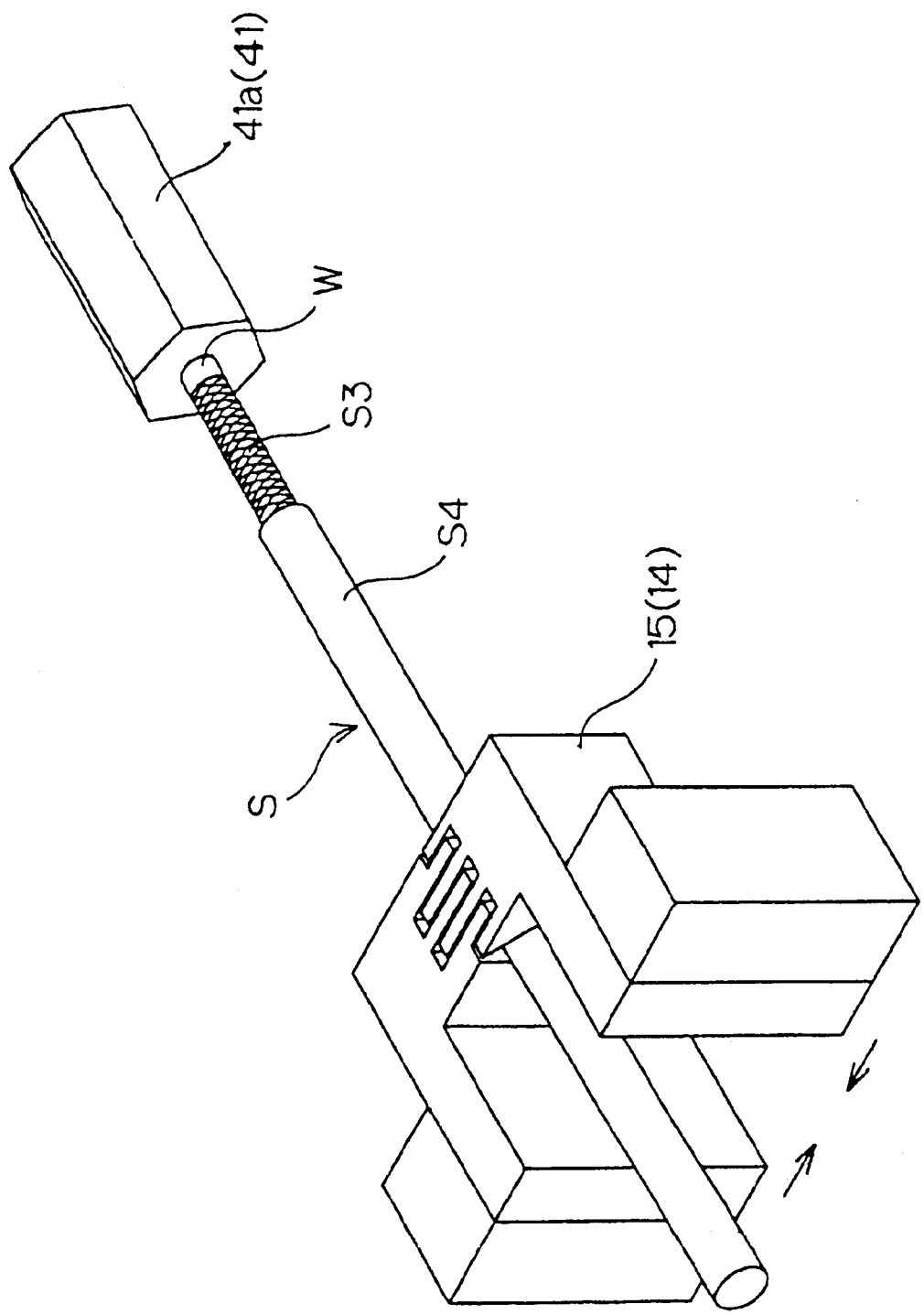
FIG. 5 is a perspective view showing a positioned state when the shielded cable is to be clamped.

With reference to FIG. 1, the control unit 100 is comprised of a microcomputer and other electric and/or electronic devices and causes the respective units described above to operate in accordance with the procedure described below. FIG. 5 is a perspective view showing a positioned state when the shielded cable S is to be clamped, and FIG. 6 is a side view showing a state where the positioning member 41a of the positioning unit 41 projects in the initial state.

Figure 6:
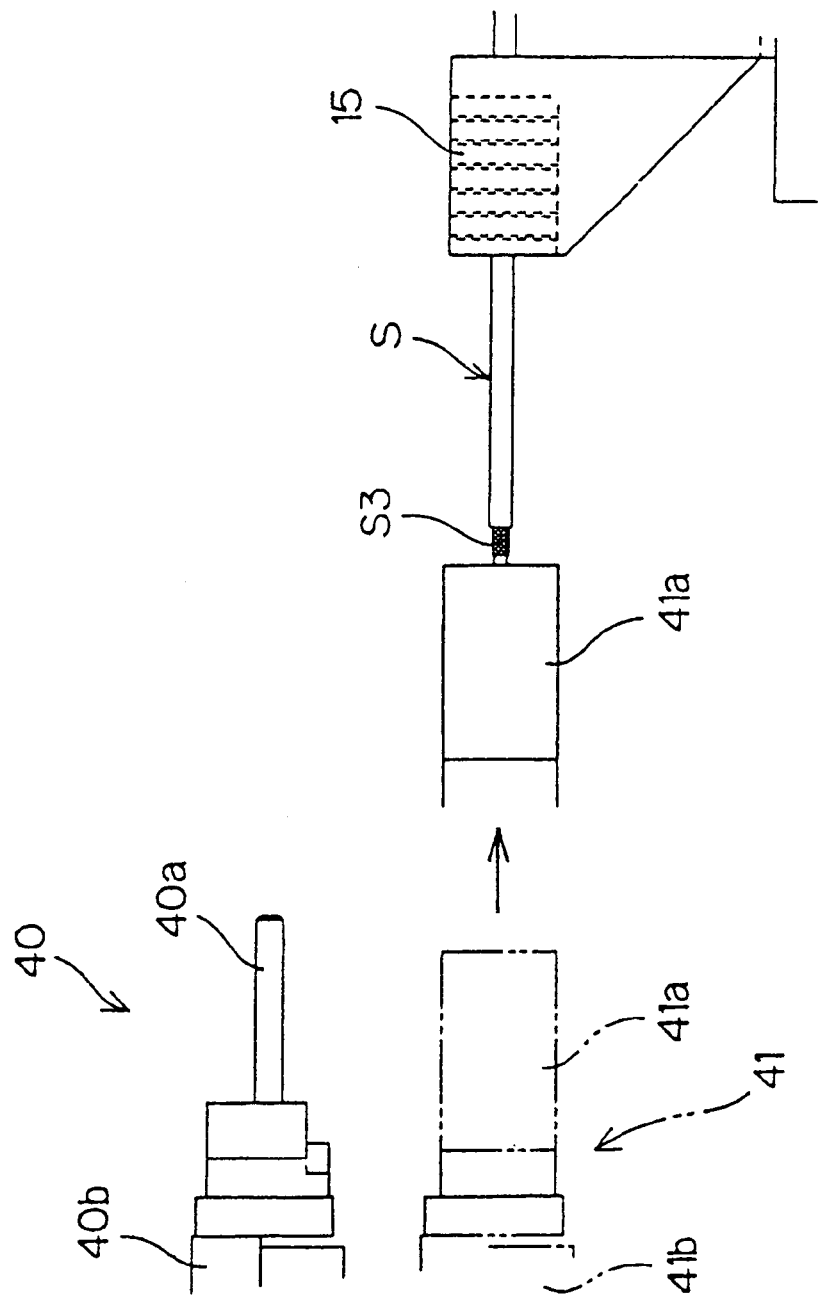
FIG. 6 is a side view showing a projected state of a positioning member of a positioning unit from its initial state.

With reference to FIGS. 2, 5 and 6, the positioning unit 41 is moved upward to a position where it can be coaxially opposed to the shielded cable S, and the positioning member 41a is projected to a positioning position at front or toward the shielded cable S by the air cylinder 41b in the illustrate home position (initial state). In this state, an unillustrated operator brings the end of the shielded cable S into contact with the positioning member 41a of the positioning unit 41 as shown in FIG. 5 while gripping a portion of the shielded cable S where the woven sheath S3 has been exposed by peeling, and operates the foot switch 11 (see FIG. 1) after a projection amount is determined. As a result, the clamps 15 of the clamping unit 14 are closed to hold the shielded cable S. Thereafter, the positioning member 41a of the positioning unit 41 is retracted by the air cylinder 41b from a state shown in solid line to a state shown in phantom line in FIG. 6. The air cylinder 35 preferably is driven substantially simultaneously to arrange the pipe 40a to become substantially coaxial with the clamped shielded cable S for a subsequent step. Then, the control unit 100 proceeds to a widening step based on the position positioned by the positioning unit 41.

Figure 8:
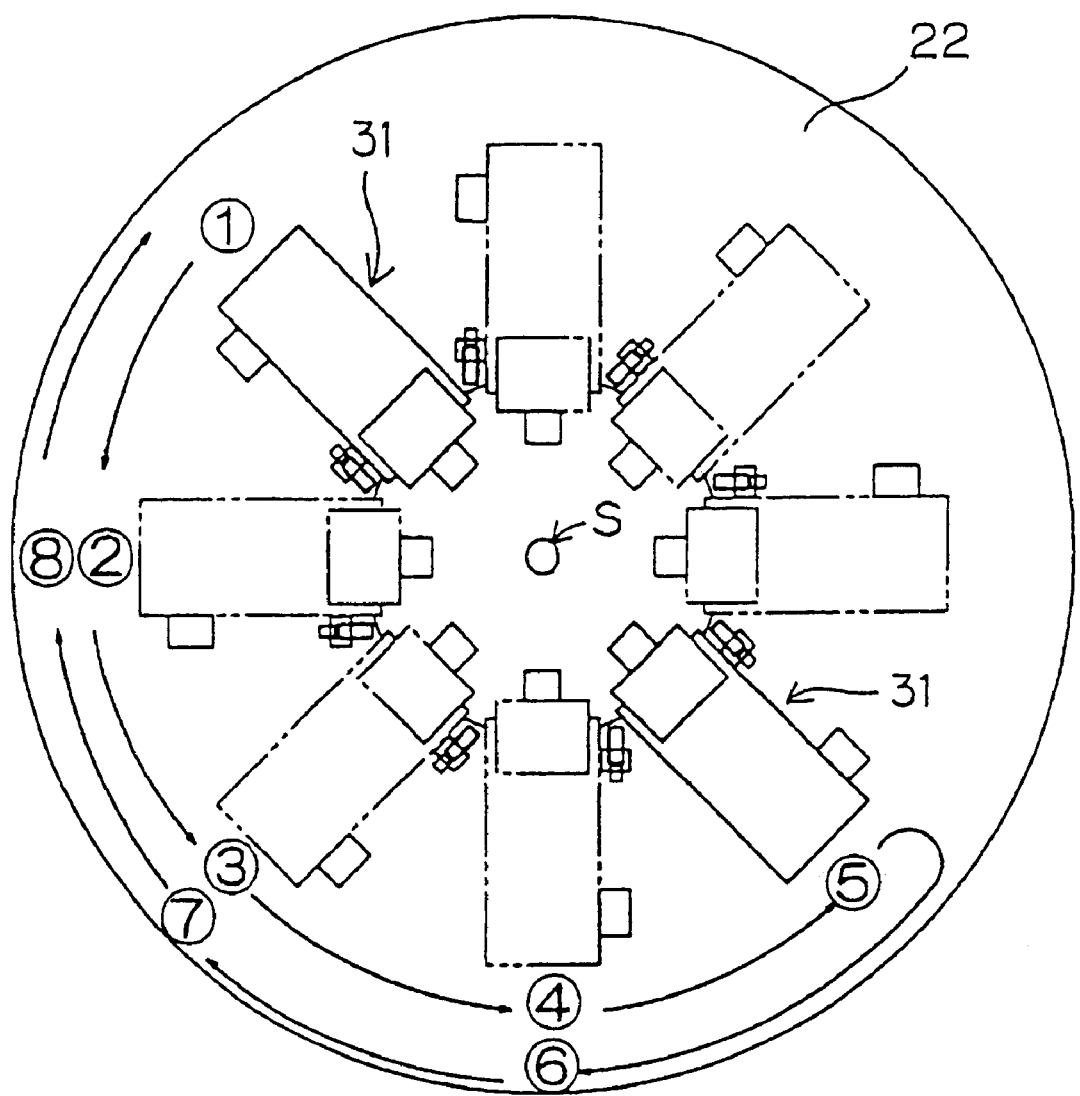
FIG. 8 is a perspective view showing a particular portion to describe a procedure of the widening step.
Figure 9:
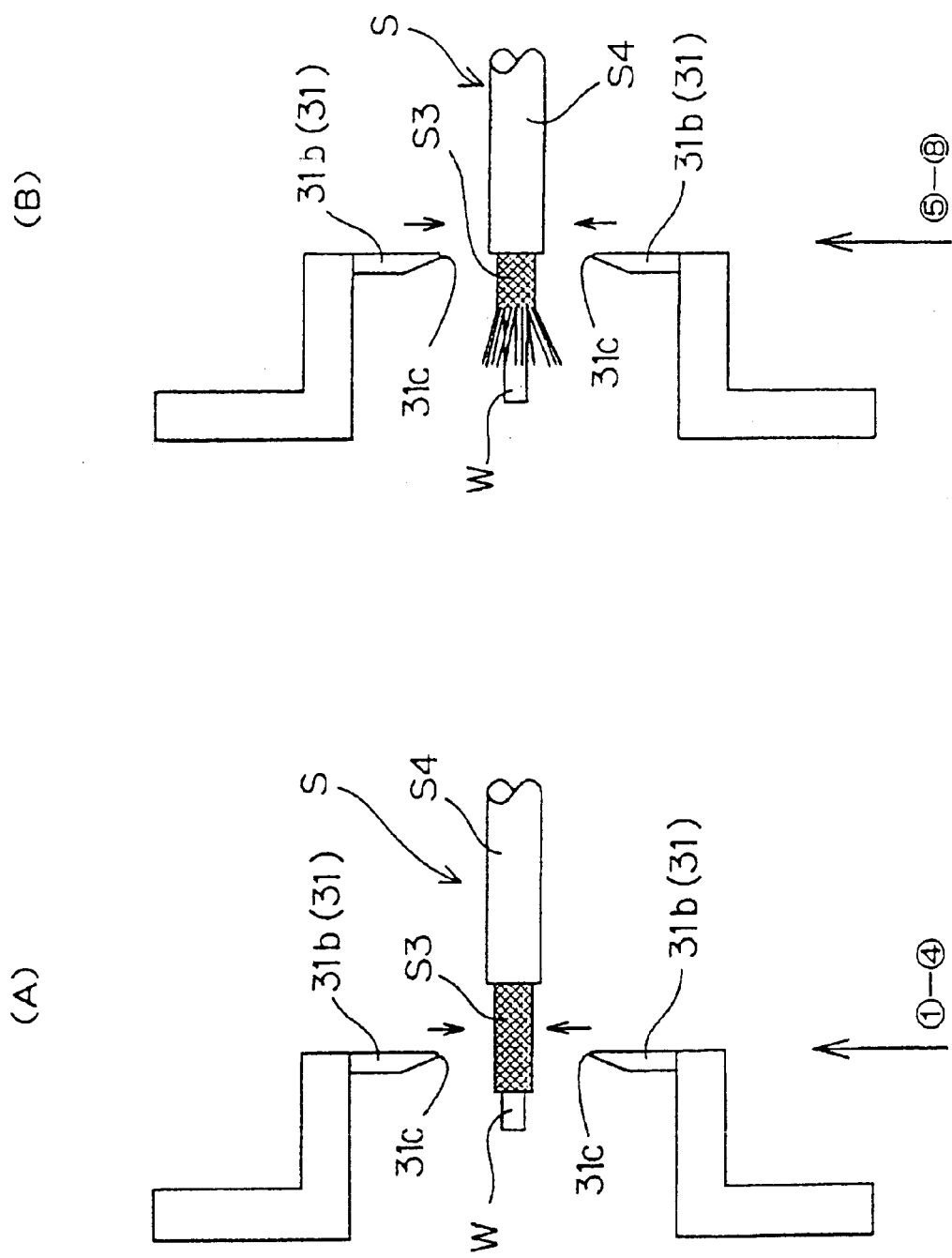
FIGS. 9(A) and 9(B) are schematic side views showing a particular portion to describe a punching position in the widening step.

FIGS. 7 and 8 are a perspective view and a rear view showing a particular portion to describe the widening step, respectively, and FIG. 9 is a schematic side view showing a particular portion to describe a punching position in the widening step. FIG. 26 shows another preferred embodiment, showing an inclined relative movement of the punches, wherein the punches may be either inclined (as shown) or substantially perpendicular (not shown) to the longitudinal direction L of the shielded cable S.

With reference to FIGS. 3 and 7, in the widening step, the punching units 31 resting on the gear disk 22 are driven to punch the woven sheath S3 of the shielded cable S by punches 31b, thereby plastically deforming the woven sheath S3 to widen the end thereof. In performing this operation step, the control unit 100 drives the uniaxial robot 17 built in the rail block 16 on the base 12 to position the punches 31b of the punching units 31 resting on the gear disk 22 at an intermediate position of the woven sheath S3 of the clamped shielded cable S in the showing embodiment (see FIG. 9(A)). Further, the induction motor 23 is driven intermittently to rotate or pivot the gear disk by a predetermined or predeterminable angle, preferably by about 45° counterclockwise when viewed from behind, and the punching units 31 apply punching in positions indicated by ① to ④ in FIG. 8 after every rotation. As a result, the exposed woven sheath S3 is substantially uniformly compressed over its entire circumference and the end is widened.

Further, in the illustrated embodiment, the gear disk 22 is rotated further counterclockwise preferably by 45°, i.e. preferably by 180° in total upon the completion of the fourth punching. Then, the punching units 31 are advanced by the uniaxial robot 17 so as to relatively displace the punches 31b with respect to the woven sheath S3 to a position where the punches 31b can substantially punch a base portion of the woven sheath S3. Then, the gear disk 22 is intermittently rotated clockwise preferably by 45° when viewed from behind, and the punching units 31 apply punching in positions indicated by ⑤ to ⑧ after every rotation. As a result, the exposed woven sheath S3 is bent at the base portion over its entire circumference and is widened in directions at an angle different from 0° or 180°, preferably substantially normal to the insulating sheath S4.

Upon the completion of the woven sheath widening step, the control unit 100 proceeds to an operation step of turning the widened woven sheath S3.

Figure 10:
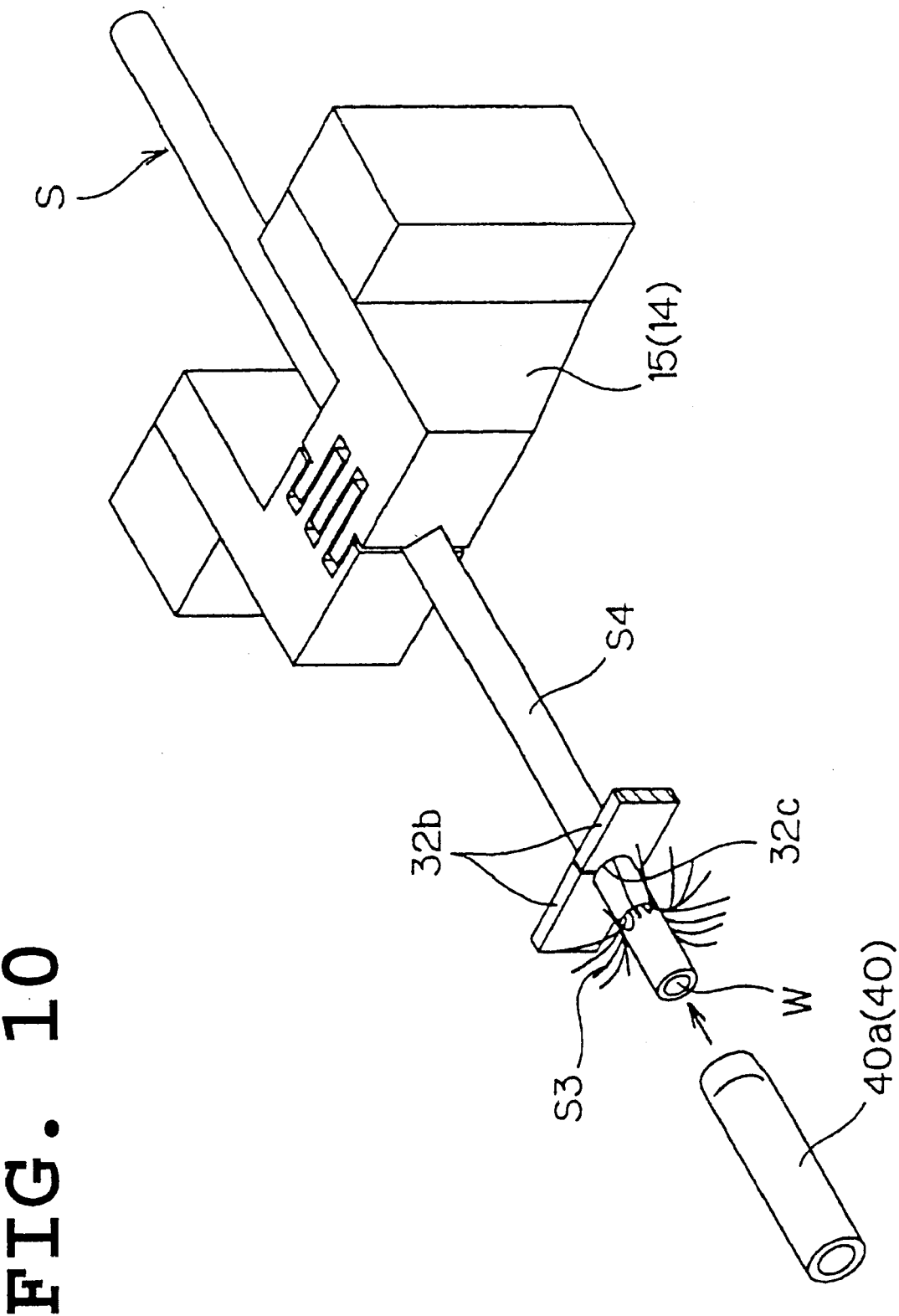
FIG. 10 is a perspective view showing one process of a turning step.
Figure 11:
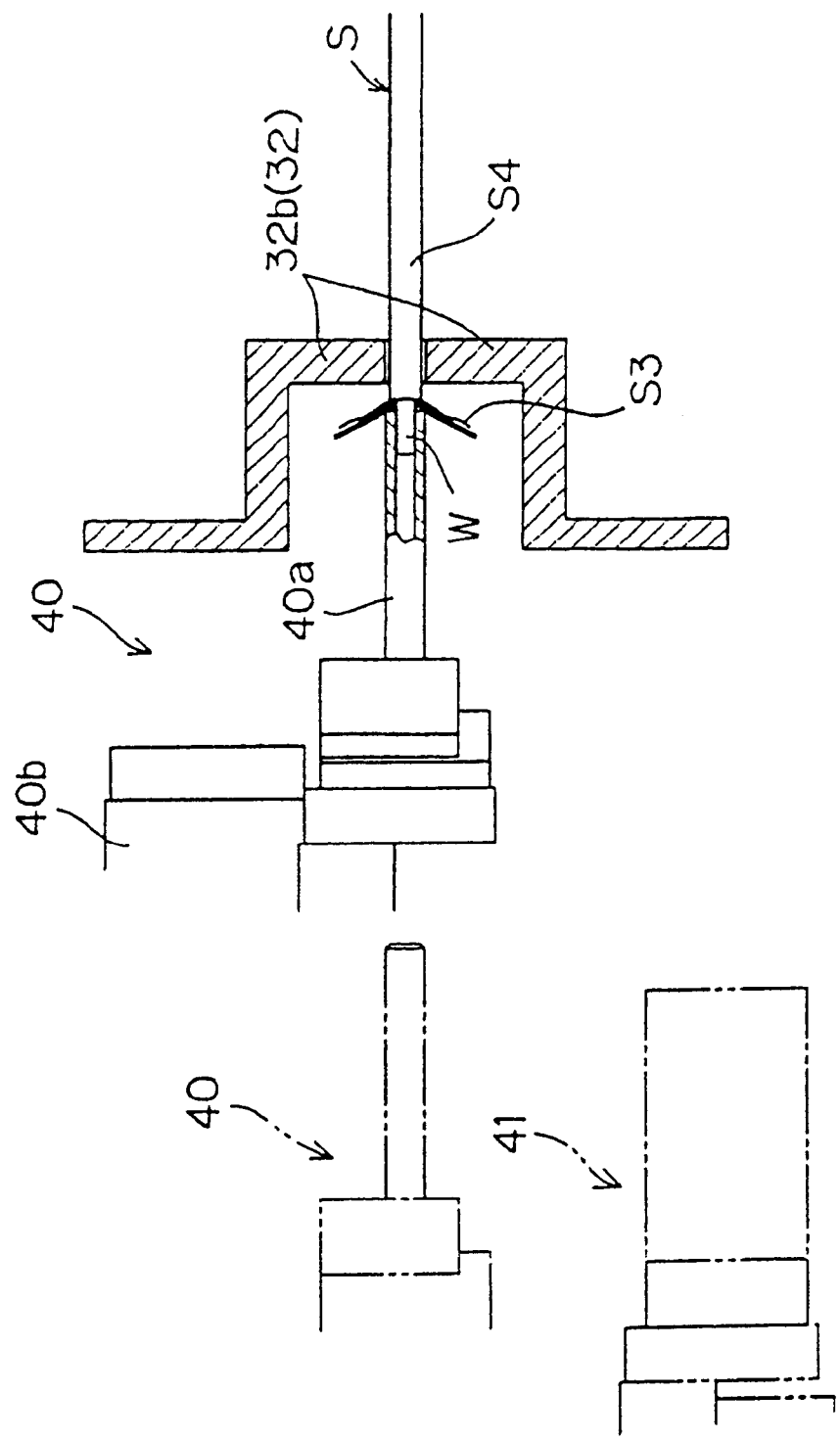
FIG. 11 is a schematic section showing another process of the turning step.
Figure 12:
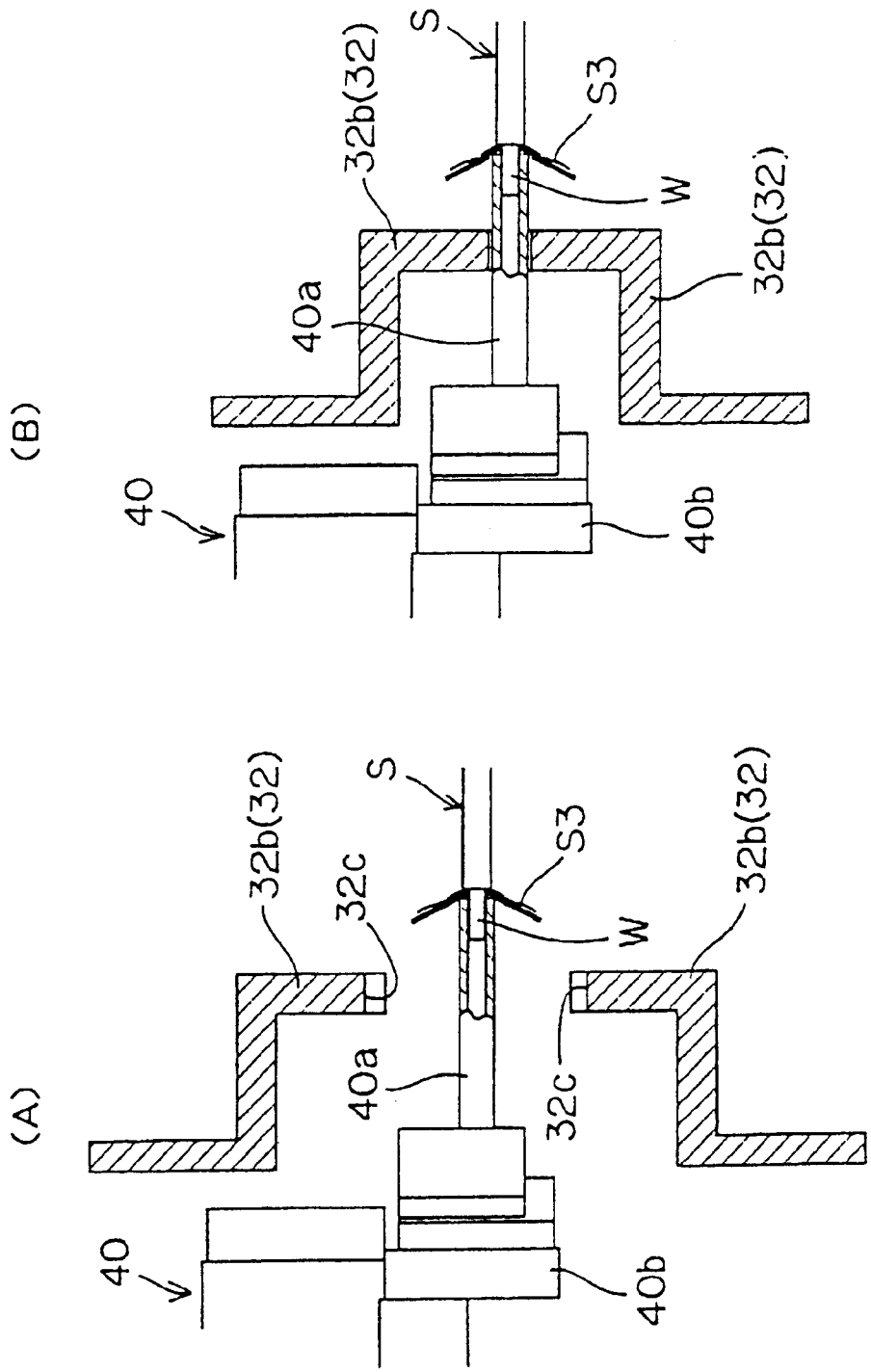
FIG. 12 is a schematic section showing still another process of the turning step.

FIG. 10 is a perspective view showing one process of the turning step, and FIGS. 11 to 13 are schematic sections showing processes of the turning step.

First, with reference to FIGS. 2 and 10, upon the completion of the widening step, the control unit 100 drives the uniaxial robot 17 to advance the gear disk 22, thereby displacing the turning plates 32*b* of the woven sheath turning units 32 to positions near the end of the insulating sheath S4. Subsequently, the air cylinders 32*a* of the woven sheath turning units 32 drive the turning plates 32*b* to substantially surround the insulating sheath S4 at a position near its end as shown in FIG. 10.

In this state, the pipe 40*a* coaxially opposed to the shielded cable S is displaced by the air cylinder 40*b* from a retracted position shown in phantom line to an introduction position shown in solid line as shown in FIG. 11, thereby introducing the exposed insulated wire W into the pipe 40*a*. In this process, the turning plates 32*b* of the woven sheath turning units 32 substantially surround the insulating sheath S4 at the position near its end (see FIG. 10). Accordingly, even if the projecting length of the shielded cable S is long, the shielded cable S is unlikely to be buckled since it is introduced into the pipe 40*a* while being reinforced.

Next, as shown in FIG. 12(A), the control unit 100 temporarily opens the turning plates 32*b* after the introduction into the pipe 40*a*, and then causes the uniaxial robot 17 to retract the turning plates 32*b* to positions outside the pipe 40*a*. Subsequently, as shown in FIG. 12(B), the pipe 40*a* is surrounded by the turning plates 32*b* and then moved forwardly. As a result, the woven sheath S3, which has been widened with its base end tightly held between the pipe 40*a* and the insulating sheath S4, is turned up around the end of the insulating sheath S4 as shown in FIG. 13.

As shown in FIG. 13, a radius r1 of the recesses 32*c* of the turning plates 32*b* is set to conform to a final dimension D1 of the woven sheath S3 turned up around the insulating sheath S4 in the illustrated embodiment. Here, the phrase "so set as to conform to the final dimension D1" means that the outer diameter of the shielded cable S in its position where the woven sheath S3 is turned up is measured from samples obtained by plastically deforming the woven sheaths S3 in advance to have the final dimension D1. These measurement results then are used as data. Based on this data, a dimension obtained when the turning plates 32*b* are slid from the side of the pipe 40*a* toward the insulating sheath S4 is set to become the final dimension D1.

On the other hand, an outer radius r2 of the pipe 40*a* is set to have a fitting tolerance with respect to the radius r1 of the recesses 32*c* of the turning plates 32*b*. Accordingly, in this embodiment, when the turning plates 32*b* are moved toward the insulating sheath S4 while surrounding the pipe 40*a*, the pipe 40*a* can turn the woven sheath S3 up around the insulating sheath S4 while maintaining a clearance necessary and sufficient for a sliding movement. Therefore, a suitable final dimension can be obtained.

Figure 14:
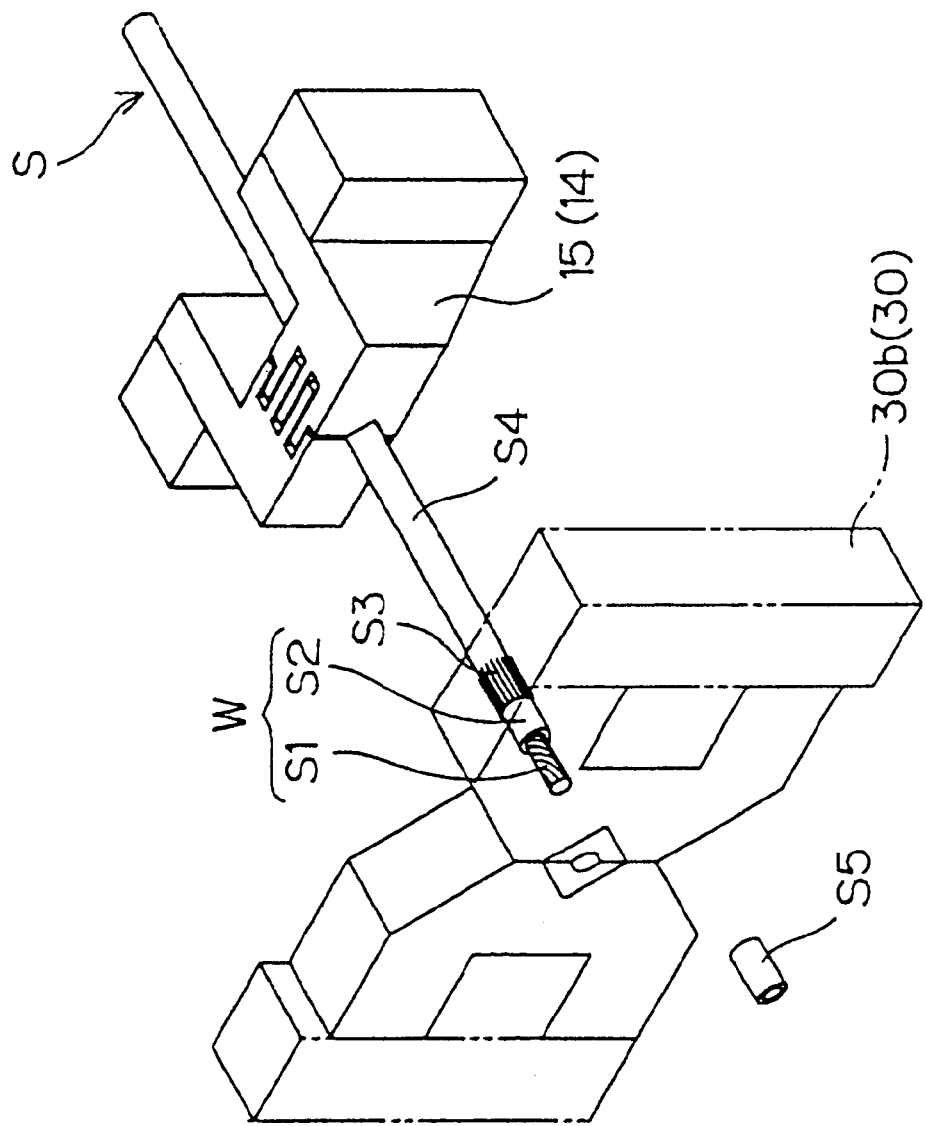
FIG. 14 is a perspective view showing a peeling step.

Upon the completion of the woven sheath turning step, a peeling step is performed. With reference to FIG. 14, the control unit 100 causes the uniaxial robot 17 to retract the gear disk 22 upon the completion of the turning step, and causes the peeling blades 30*b* of the peeling units 30 to be substantially opposed to an intermediate position of the insulation coating S2 of the insulated wire W. The control unit 100 then drives the air cylinders 30*a* (see FIG. 2) to cut the insulation coating S2. Thereafter, the uniaxial robot 17 is retracted further and a cut piece S5 of the insulation coating S2 is removed from the end of the twisted wire S1, thereby completing the peeling step.

After the completion of the peeling step, the respective parts are returned substantially to their initial positions and the clamps 15 are opened to release the shielded cable S having its end processed.

As described above, in the aforementioned embodiment, the woven sheath S3 of the shielded cable S can be easily deformed and widened even if it has a multi-layer construction. This brings about a remarkable effect of realizing a shielded cable end processing more suited to an automatic operation.

The aforementioned embodiment is nothing but a specific preferable example of the present invention, and the present invention is not limited thereto. A variety of design changes can be made within the scope of the present invention as claimed.

As described above, the woven sheath of the shielded cable easily can be deformed and widened even if it has a multi-layer construction. This brings about a remarkable effect of realizing a shielded cable end processing more suited to an automatic operation.

Figure 15:
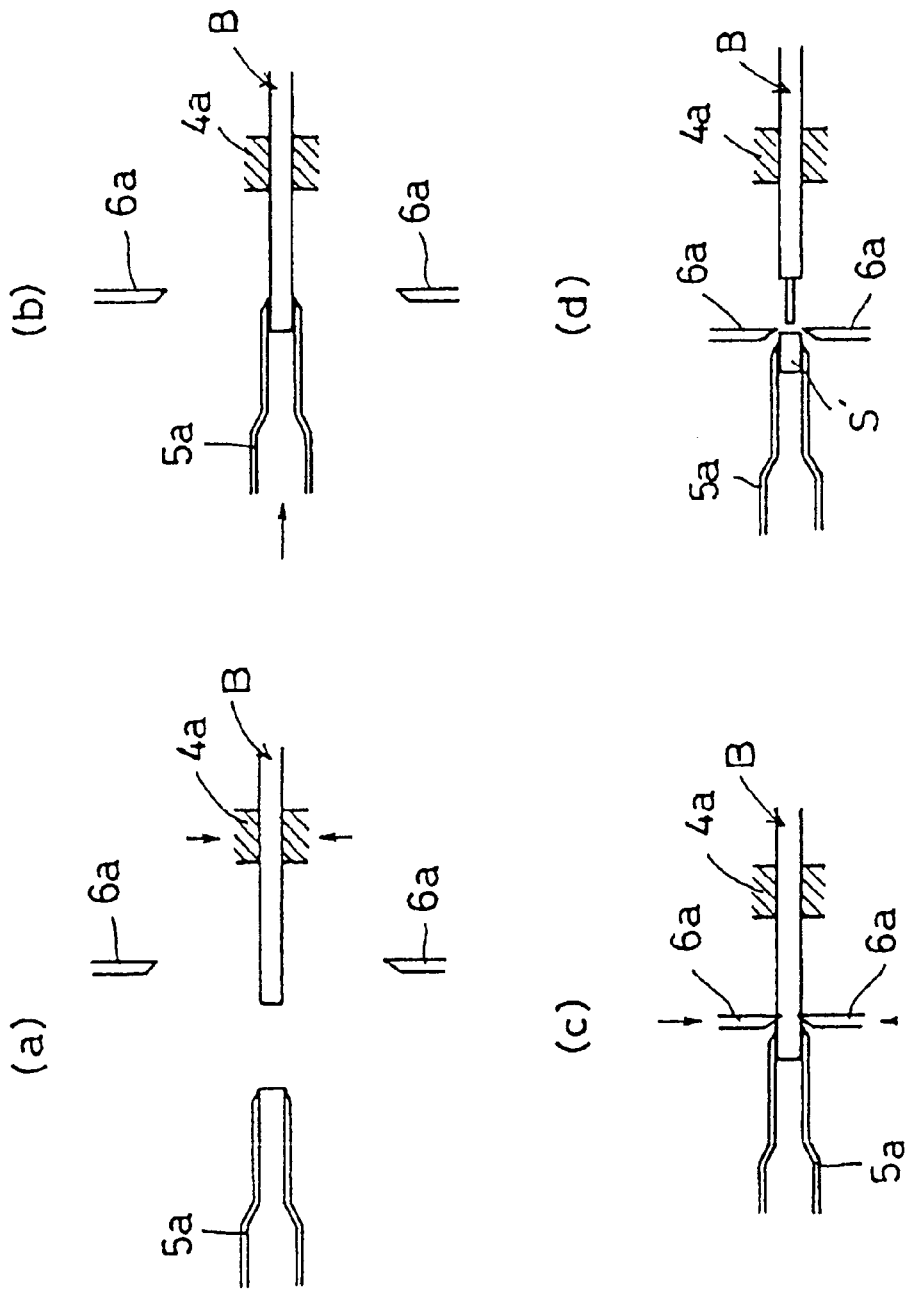
FIGS. 15(a) to 15(d) are diagrams showing one embodiment of an inventive method.

FIGS. 15(*a*) to 15(*d*) show one embodiment of a cable end processing method according to the invention. First, a positioned cable B is held by clamps 4*a* (see FIG. 15(*a*)). Subsequently, a suction nozzle 5*a* positioned concentrically with the held cable B is advanced to introduce an end of the wire B therein to see FIG. 15(*b*)). The suction nozzle 5*a* has a function of guiding the cable B, i.e. the hole diameter of the leading end thereof is slightly larger than the outer diameter of the cable B to hold the end of the cable B in a fixed position.

Subsequently, a pair of opposed peeling blades 6*a* are pierced into the cable B to make a substantially annular cut in an insulation coating S2 (see FIG. 15(*c*)). Thereafter, the peeling blades 6*a* and the cable B are moved relative to one another substantially along the longitudinal direction of the cable B (the suction nozzle 5*a* also preferably is moved when the peeling blades 6*a* are moved), thereby removing a piece of the insulation coating S2 cut by the peeling blades 6*a* to expose an end of a conductor, a core wire or a woven sheath inside it (see FIG. 15(*d*)).

A scrap insulation coating S' produced by the above operation is present in the suction nozzle 5*a*, and is sucked by the suction nozzle 5*a* to be collected into a scrap storage (not shown).

Figure 16:
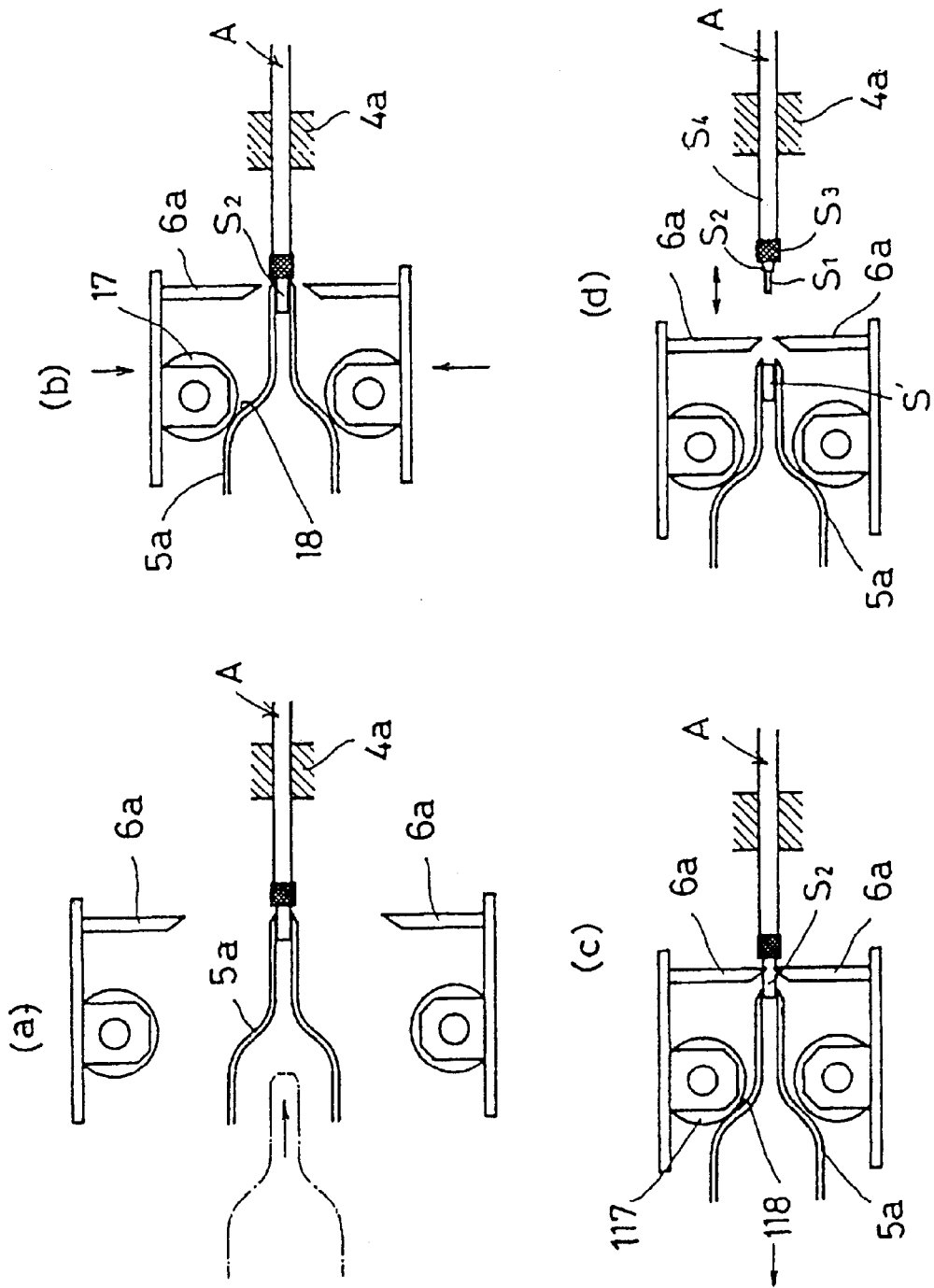
FIGS. 16(a) to 16(d) are diagram showing another embodiment of the inventive method.

FIGS. 16(*a*) to 16(*d*) show another embodiment of the end processing method according to which an end of a cable is introduced into the suction nozzle 5*a* up to a position beyond an insulation coating cutting position where the cut is made by the peeling blades 6*a*. Here, a cam surface 118 formed on the suction nozzle 5*a* is pushed by cam followers 117, which move together with the peeling blades 6*a*, to move the suction nozzle 5*a* backward. The suction nozzle 5*a* is retracted from the insulation coating cutting position before the peeling blades 6*a* are pierced into the cable (shown cable is a shielded cable A). This securely prevents the peeling blades 6*a* from being broken due to the interference with the suction nozzle 5*a*. By adopting the method of FIG. 16, the suction nozzle 5*a* is fitted up to the position beyond the insulation coating cutting position, so that the widened woven sheath S3 of the shielded cable A can be further pushed and widened by the suction nozzle 5a.

One embodiment of an apparatus for processing an end of a shielded cable is shown in FIGS. 17 to 20. This apparatus is identified by the numeral 1 and is adapted to process the shielded cable A, in which an end of a woven sheath S3 is exposed as shown in FIG. 7(b) by peeling off a part of an outer or insulating sheath S4, so as to expose an end of a conductor S1 (see FIGS. 21(a) and 21(b)). The cable end processing apparatus 1 is provided with a base 2, a positioning unit 3 placed on the base 2 for positioning an end of the shielded cable A, a clamping unit 4 for substantially holding the shielded cable A, a suction unit 5 having a suction nozzle 5a, a peeling unit 6, a punching unit 7 for substantially widening an end of a woven sheath S3, a turning unit 8 for substantially turning the woven sheath S3 and a sliding mechanism 9.

Figure 17:
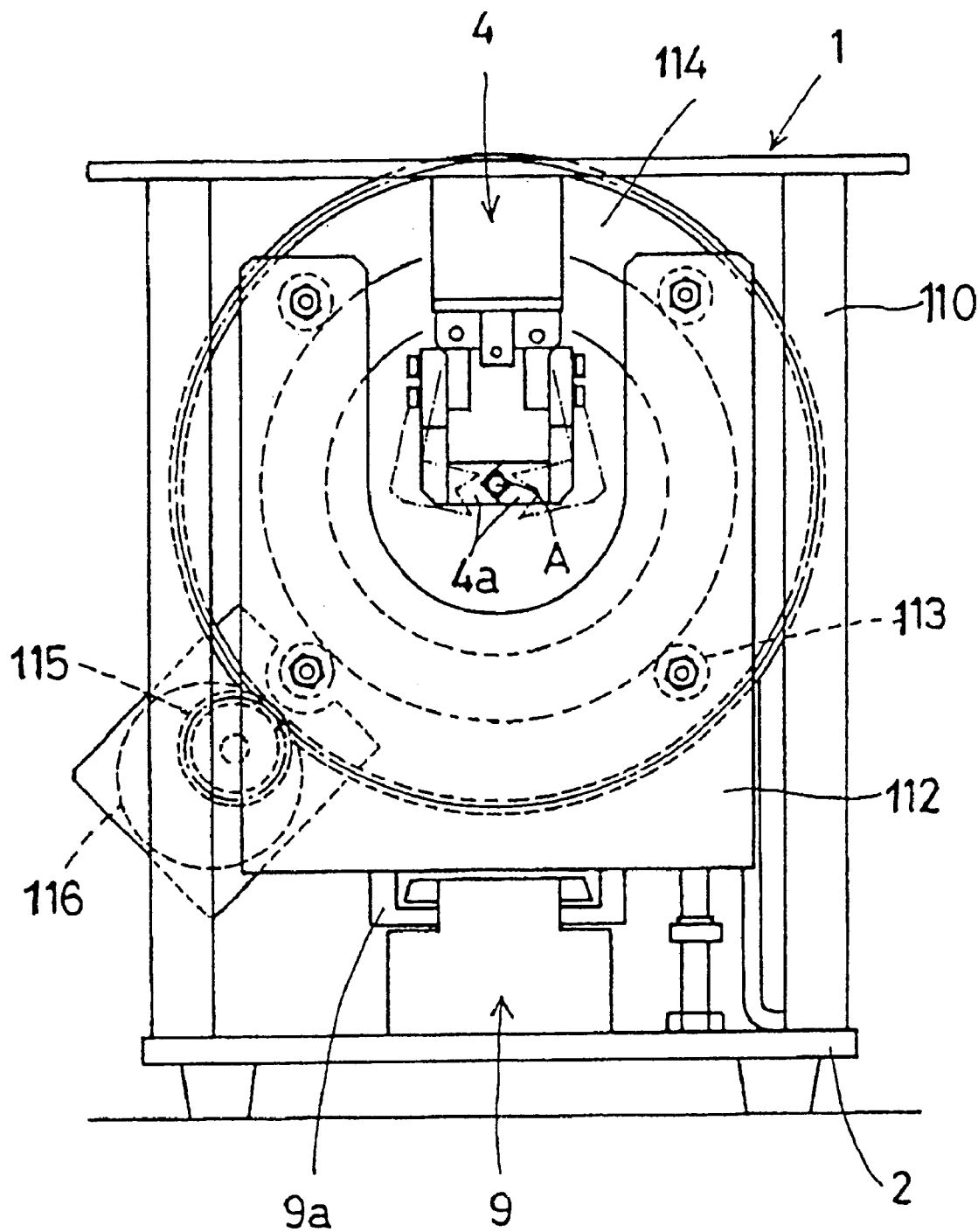
FIG. 17 is a front view showing one embodiment of a cable end processing apparatus.

A stay 110 stands on the front side (side where the shielded cable is fed) of the base 2, and the clamping unit 4 for holding the shielded cable A between a pair of opposed clamps 4a to locate it on a reference line C (this is virtual line) is mounted on the stay 110 (see FIG. 17).

Figure 18:
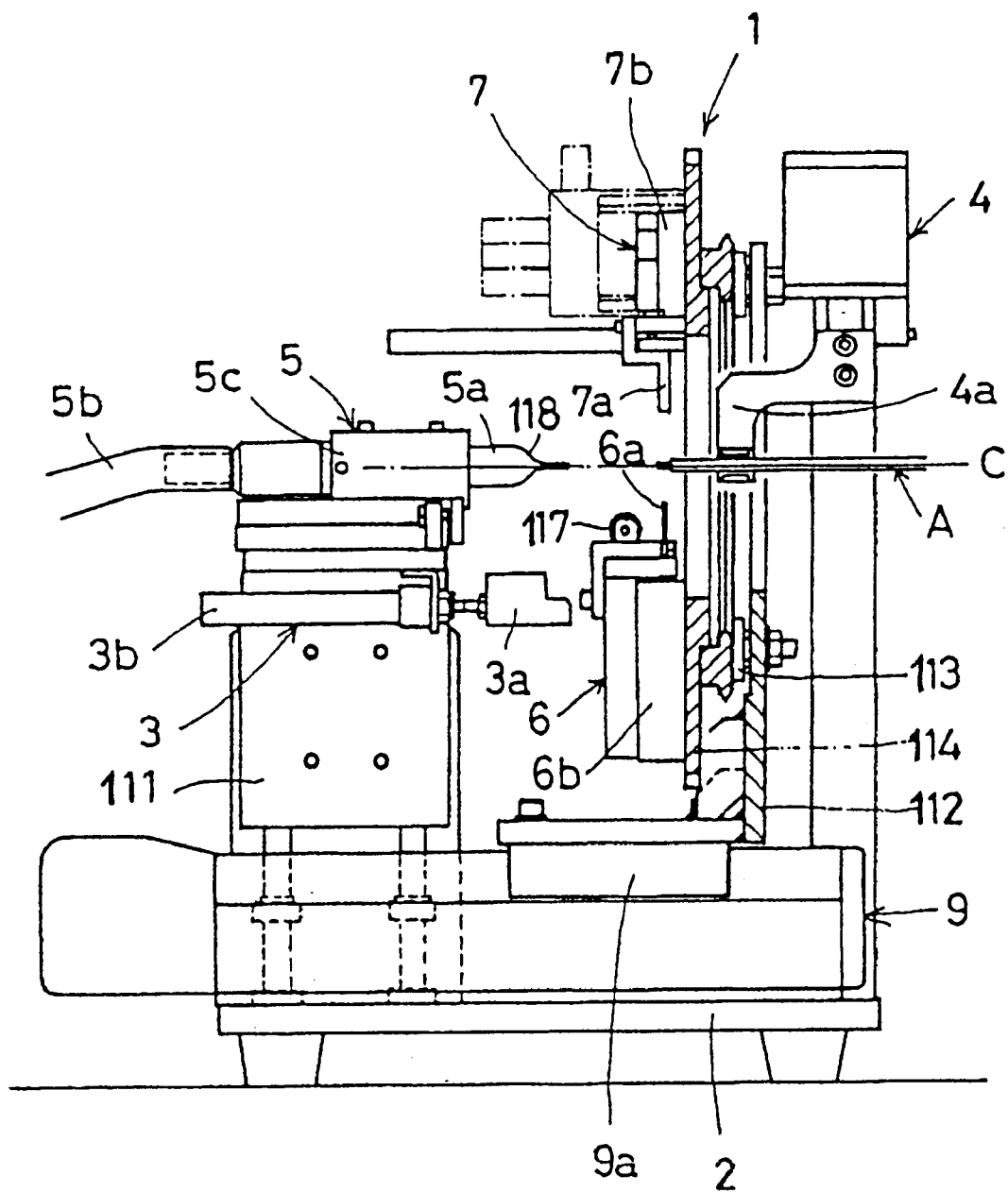
FIG. 18 is side view in section of the cable end processing apparatus.

The positioning unit 3 shown in FIG. 18 moves a positioning member 3a to a predetermined position on the reference line C by advancing it by means of an air cylinder 3b. The suction unit 5 is provided with the cam surface 118, which was described with reference to FIG. 16, at the leading end of the suction nozzle 5a, and has a suction hose or line 5b extending from a suction means (not shown) connected with its rear end. The suction unit 5 is moved substantially forward and backward by an air cylinder 5c. The positioning unit 3 and the suction unit 5 are positioned alternately by being moved upwardly and downwardly by an air cylinder 111. In other words, although the suction nozzle 5a is located on the reference line C in the state of FIG. 18, the positioning unit 3 is brought to the reference line C when the suction unit 5 and the positioning unit 3 are displaced, preferably pushed up.

Figure 19:
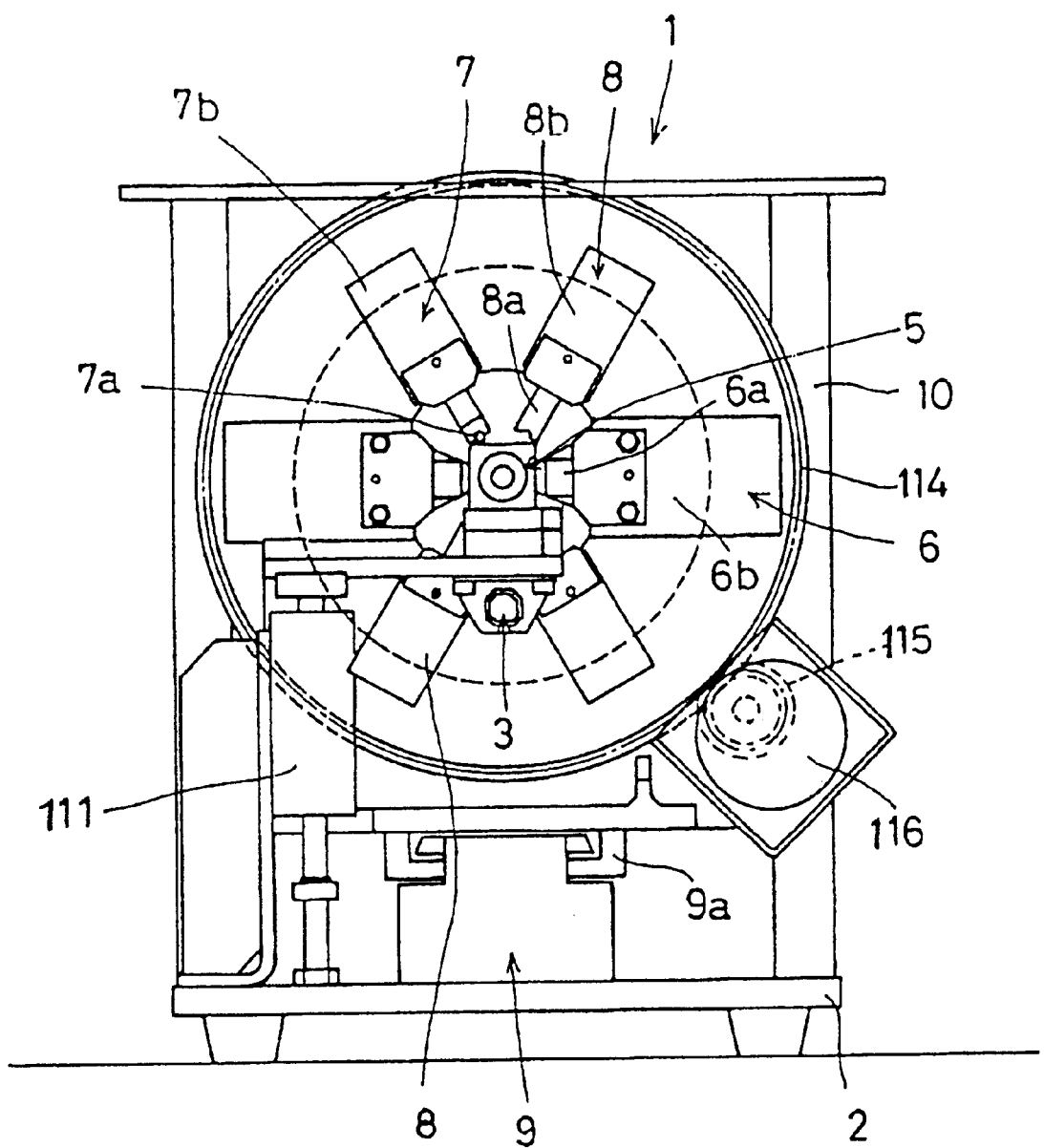
FIG. 19 is a rear view of the cable end processing apparatus.
Figure 20:
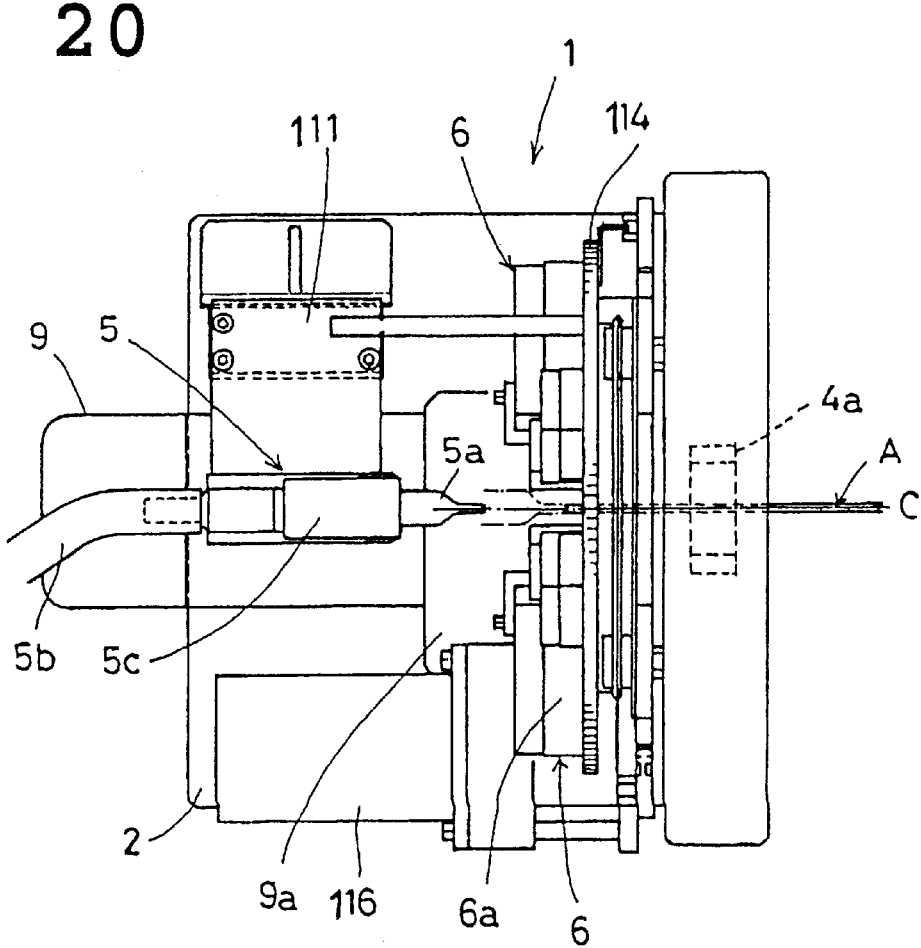
FIG. 20 is a plan view of the cable end processing apparatus.

The sliding mechanism 9 has a slider 9a displaceable substantially along forward and backward directions while being position-controlled by a driving source (not shown). A mount plate 112 stands on the slider 9a and preferably has U-shape when viewed from front. A perforated gear disk 114 is mounted rotatably or pivotably on the mount plate 112 via guide rollers 113 and the center of rotation preferably is located substantially on the reference line C. As shown in FIG. 19, the aforementioned peeling unit 6, punching unit 7 and turning unit 8 are mounted on the gear disk 114.

The gear disk 114 is connected with a motor 116 via a gear 115 in mesh with the teeth formed on the periphery thereof and is driven by the motor 116 to intermittently rotate when necessary. Though not shown, the illustrated apparatus is provided with a sensor and the like for controlling the rotational angle of the gear disk 114.

The peeling unit 6 shown in FIG. 19 is operated such that a pair of peeling blades 6a, arranged substantially opposite to each other with the reference line C therebetween, are pushed by air cylinders 6b to cut into the shielded cable A. The peeling unit 6 is provided with the cam followers 117, which move together with the peeling blades 6a to push the cam surface 118 of the suction nozzle 5a.

The punching unit 7 is operated such that punches 7a are moved by air cylinders 7b to strike the exposed woven sheath S3 at the end of the shielded cable A. Punching is performed in positions of the shielded cable A, which come to meet the punches 7 by intermittently rotating the gear disk 114 by a suitable angle to uniformly warp and bend the woven sheath S3 at its circumference.

The turning members 8a of the turning unit 8 have a semicircular slot and are opposed to each other. The turning members 8a are moved substantially toward each other by air cylinders 8b to define a hole H (see FIG. 25) having a center substantially located on the reference line C. The diameter of the hole H is set to accommodate the finished woven sheath S3 substantially turned up around the outer sheath S4 of the shielded cable A.

Figure 22:
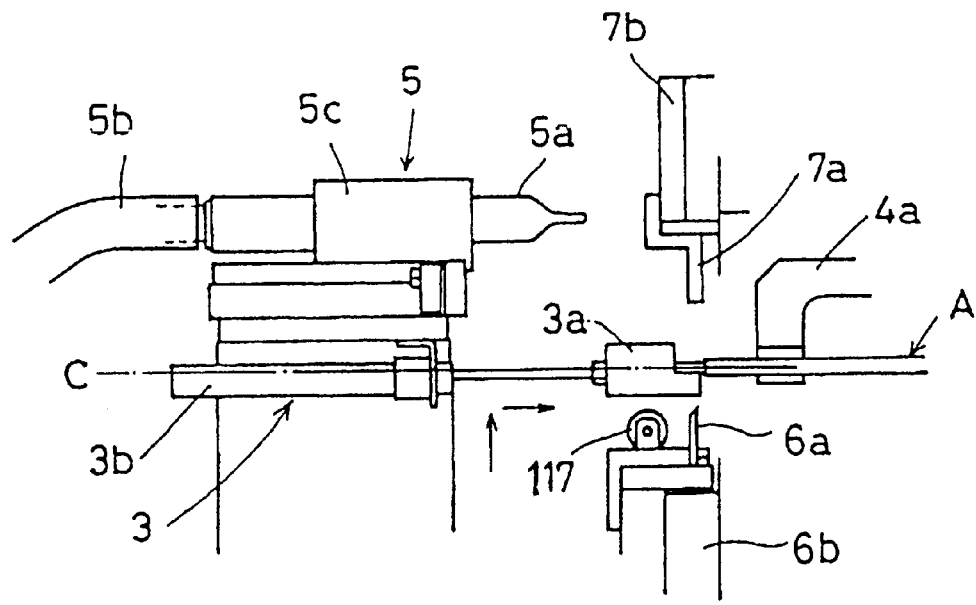
FIG. 22 is a diagram showing an operation step of positioning the shielded cable.

The cable end processing apparatus 1 thus constructed operates as follows. The positioning unit 3, as shown in FIG. 22, is moved to the predetermined or predeterminable position, where the shielded cable A is held by the clamping unit 4 after the end of the shielded cable A is positioned by the positioning member 3a.

Figure 23:
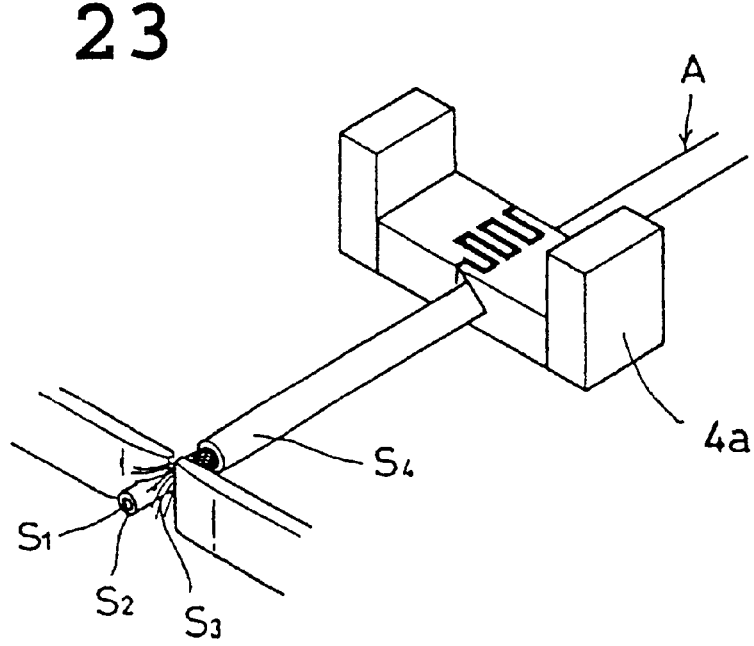
FIG. 23 is a perspective view showing an operation step of widening an exposed woven sheath.
Figure 24:
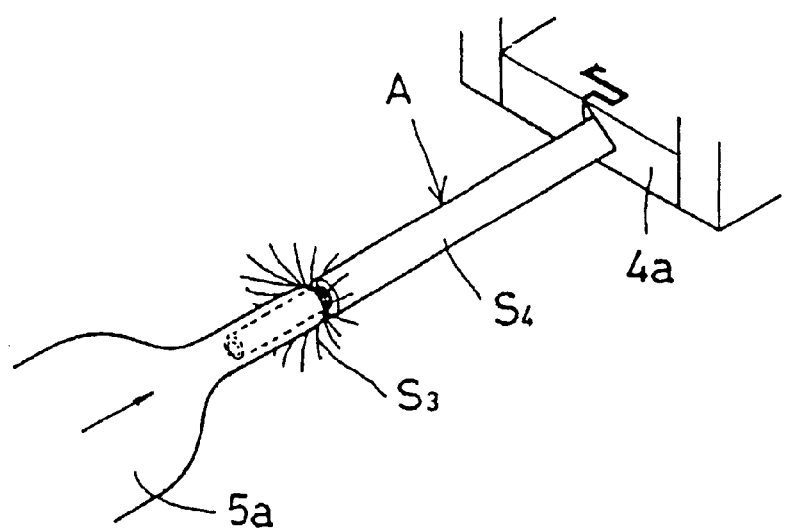
FIG. 24 is a perspective view showing an operation step of pushing the woven sheath wider open by a suction nozzle.

Subsequently, as shown in FIG. 23, the punching unit 7 is operated to press the exposed woven sheath S3 of the shielded cable A from outside by the punches 7a. This operation is repeated while the gear disk 14 shown in FIGS. 17 to 20 is rotated or pivoted intermittently, thereby opening the end of the exposed woven sheath S3 wider. During the punching operation, the positioning unit 3 is returned to the position of FIG. 18, and the suction unit 5 is brought substantially to the reference line C. After the exposed woven sheath S3 is widened, the suction nozzle 5a of the suction unit 5 is moved forward to insert the suction nozzle 5a between the insulated wire and the widened exposed woven sheath S3, thereby pushing the exposed woven sheath S3 open more widely. In the meantime, the gear disk 14 is returned to its original position (state of FIG. 19).

Figure 25:
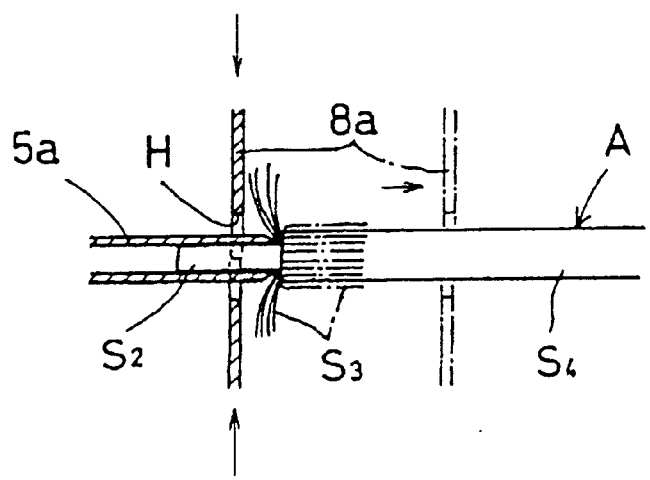
FIG. 25 is a diagram showing an operation step of turning the woven sheath by a turning unit.

Thereafter, as shown in FIG. 25, the turning unit 8 is operated to bring the turning members 8a into contact with each other substantially around the exposed insulated wire, and the turning members 8a are moved to a phantom-line position of FIG. 25 by the sliding mechanism 9 to push and turn the exposed woven sheath S3 up around the outer sheath S4 of the shielded cable A. At this time, the turned woven sheath S3 is straightened into its final shape by the turning members 8a.

Subsequently, the turning members 8a struck against each other are separated from each other to temporarily return an element mounted on the slider 9a substantially to its original position, where the peeling unit 6 is operated to make an annular cut in the insulation coating S2 of the exposed insulated wire. When the piercing of the peeling blades 6a is started, the cam followers 117 come into engagement with the cam surface 118 as described with reference to FIG. 16, thereby pushing the suction nozzle 5a to move it back to a position retracted from the insulation coating cutting position. The cutting of the insulation coating S2 by the peeling blades 6a is done after this backward movement of the suction nozzle 5a. Accordingly, there is no likelihood that the peeling blades 6a are broken upon the contact with the suction nozzle 5a.

In the case of the illustrated apparatus, the suction nozzle 5a is moved backward by pushing a piston (not shown) of the air cylinder 5b. An alternative construction may be such that the suction nozzle 5a is biased forwardly by a spring and the nozzle 5a is moved backwardly by compressing this spring.

An another alternative method for moving the suction nozzle 5a may be such that the suction nozzle 5a is moved by a servo motor while being position-controlled.

Upon the completion of the cutting of the insulation coating S2 by the peeling blades 6a, the slider 9a is driven to move the element mounted thereon backward (direction away from the clamping unit 4), and a piece of the insulation coating S2 cut by the peeling blades 6a stopping at the cutting end points is peeled off the conductor S1 and is collected as a scrap insulation coating S' by the suction nozzle 5a.

Figure 21:
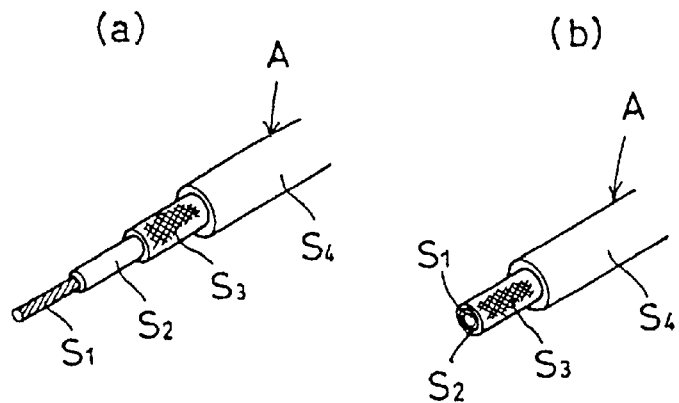
FIG. 21(a) is a perspective view of a shielded cable and FIG. 21(b) is a perspective view showing the shielded cable having its outer sheath partly peeled off.

In the above procedure, the conductor S1 (see FIGS. 21(*a*) and 21(*b*)) of the shielded cable A is exposed, thereby completing the cable end processing.

As described above, the end of the cable is introduced into the suction nozzle to be guided thereby, and the piece of the insulation coating is cut and peeled off while maintaining the guided state. This makes the peeling conditions constant and the quality of the processed cable ends stable.

Since the produced scrap insulation coating is securely collected by suction, there is no likelihood of deteriorating the work environment and causing the apparatus to stop.

Further, since the suction by the suction nozzle is done without any loss, the suction means is allowed to have a small suction capacity, thereby reducing a running cost of the apparatus.

What is claimed is:

1. An apparatus for processing an end of a shielded cable, the shielded cable having an insulated wire, a conductive sheath covering the insulated wire and an insulating sheath covering the conductive sheath, a portion of the insulating sheath adjacent to the end of the shielded cable being removed to define an exposed portion of the conductive sheath, the apparatus comprising:

at least one cable clamp for holding the shielded cable;

a pair of punches spaced from the at least one cable clamp for punching the exposed portion of the conductive sheath of the shielded cable held by the at least one cable clamp;

driving means for driving the punches sufficiently to punch the exposed portion of the conductive sheath without cutting through the conductive sheath and for withdrawing the punches away from the conductive sheath after the punching of the exposed portion of the conductive sheath;

a punching control means for controlling the driving of the punches by the driving means;

changing means for changing punching positions by relatively displacing the shielded cable and the punches substantially along at least one of a circumferential direction and a longitudinal direction of the shielded cable after the withdrawing of the punches by the driving means, the changing means comprising a sliding means for relatively displacing the punches and the conductive sheath so that the punching positions can be changed between an intermediate position of the exposed portion of the conductive sheath with respect to the longitudinal direction of the shielded cable and a base end of the exposed portion of the conductive sheath substantially adjacent to the insulating sheath; and a sliding control means for controlling the sliding means so as to punch the base end of the exposed portion of the conductive sheath after the punching of the intermediate position of the exposed portion of the conductive sheath.

2. The apparatus of claim 1, wherein the driving means drives the pair of punches relative to the exposed portion of the conductive sheath along a relative movement direction arranged at an angle of between about 70° and about 110° with respect to the longitudinal direction of the shielded cable.

3. The apparatus of claim 1, wherein the punches each define a plane arranged at an angle of between about 70° and about 110° with respect to the longitudinal direction of the shielded cable.

4. The apparatus of claim 1, further comprising a positioning means for positioning a holding position of the shielded cable by the at least one cable clamp;

wherein the pair of punches punch the exposed portion of the conductive sheath of the shielded cable held by the at least one cable clamp based on the holding position of the shielded cable positioned by the positioning means.

5. The apparatus of claim 1, wherein each of said punches comprises a linear punching edge disposed for contacting the conductive sheath.

6. The apparatus of claim 1, further comprising:

a pipe dimensioned for surrounding the insulated wire exposed by widening the conductive sheath, a displacing means for relatively displacing the pipe and the shielded cable between an introduction state where the insulated wire is introduced into the pipe and a retracted state where the insulated wire is retracted to outside the pipe, a pair of turning members which are arranged such that substantially semicircular recesses thereof can be opposed to form a substantially circular opening for substantially surrounding the pipe, an opening mechanism for opening the turning members, a reciprocating mechanism for reciprocating the turning members between a position outside the pipe and a position outside the insulating sheath of the shielded cable, and a turning control means for controlling the displacing means, the opening mechanism and the reciprocating mechanism to turn the exposed portion of the conductive sheath by sliding the turning members toward the insulating sheath after surrounding the pipe into which the insulated wire is introduced.

7. The apparatus of claim 6, wherein the insulated wire comprises a conductive core and an insulation coating surrounding the conductive core, the apparatus further comprising a peeling mechanism for peeling a portion of the insulation coating of the insulated wire exposed by turning the exposed portion of conductive sheath.

8. An apparatus for processing an end of a shielded cable, the shielded cable having a wire, an insulation coating surrounding the wire, a conductive sheath covering the insulation coating and an insulating sheath covering the conductive sheath, a portion of the insulating sheath adjacent to the end of the shielded cable being removed to define an exposed portion of the conductive sheath, the apparatus comprising:

at least one cable clamp for holding the shielded cable;

a pair of punches spaced from the at least one cable clamp for punching the exposed portion of the conductive sheath of the shielded cable held by the at least one cable clamp;

driving means for driving the punches sufficiently to punch the exposed portion of the conductive sheath without cutting through the conductive sheath and for withdrawing the punches away from the conductive sheath after the punching of the exposed portion of the conductive sheath;

a punching control means for controlling the driving of the punches by the driving means;

changing means for changing punching positions by relatively displacing the shielded cable and the punches substantially along at least one of a circumferential direction and a longitudinal direction of the shielded cable after the withdrawing of the punches by the driving means;

a suction nozzle to be fitted on the end of the shielded cable held by the at least one cable clamp, a peeling unit guided by the suction nozzle for cutting the insulation coating at the end of the shielded cable by at least one pair of substantially opposed peeling blades, and a sliding mechanism for relatively moving the peeling unit and the at least one cable clamp substantially along the longitudinal direction of the shielded cable, wherein a piece of the insulation coating of the shielded cable is peeled off and collected by the suction nozzle.

9. The apparatus of claim 8, further comprising a positioning means for positioning the end of the shielded cable where the at least one cable clamp holds the shielded cable.

* * * * *